(12) United States Patent
Tripathi et al.

(10) Patent No.: US 8,131,447 B2
(45) Date of Patent: Mar. 6, 2012

(54) INTERNAL COMBUSTION ENGINE CONTROL FOR IMPROVED FUEL EFFICIENCY

(75) Inventors: Adya S. Tripathi, San Jose, CA (US); Chester J. Silvestri, Los Gatos, CA (US)

(73) Assignee: Tula Technology, Inc., Santa Clara, CA (US)

( * ) Notice: Subject to any disclaimer, the term of this patent is extended or adjusted under 35 U.S.C. 154(b) by 633 days.

(21) Appl. No.: 12/355,725

(22) Filed: Jan. 16, 2009

(65) Prior Publication Data
US 2010/0010724 A1    Jan. 14, 2010

Related U.S. Application Data

(60) Provisional application No. 61/080,192, filed on Jul. 11, 2008, provisional application No. 61/104,222, filed on Oct. 9, 2008.

(51) Int. Cl.
*F02D 41/30* (2006.01)
*F02D 17/02* (2006.01)
*F02M 51/00* (2006.01)

(52) U.S. Cl. ............... 701/103; 123/198 F; 123/305

(58) Field of Classification Search .......... 701/103–105, 701/102, 115; 123/305, 198 F, 352, 478, 123/480, 481
See application file for complete search history.

(56) References Cited

U.S. PATENT DOCUMENTS

| | | | |
|---|---|---|---|
| 3,996,915 A | 12/1976 | Demetrescu | |
| 4,040,395 A | 8/1977 | Demetrescu | |
| 4,064,844 A | 12/1977 | Matsumoto et al. | |
| 4,100,891 A | 7/1978 | Williams | |
| 4,161,166 A | 7/1979 | Roznovsky | |
| 4,306,529 A | 12/1981 | Chiesa et al. | |
| 4,509,488 A | 4/1985 | Forster et al. | |
| 4,528,960 A | 7/1985 | Mizuno et al. | |
| 4,530,332 A * | 7/1985 | Harvey et al. | ............ 123/481 |
| 4,590,907 A | 5/1986 | Tsukamoto et al. | |

(Continued)

FOREIGN PATENT DOCUMENTS

JP    2006-118428    5/2006

(Continued)

OTHER PUBLICATIONS

U.S. Appl. No. 12/833,916, filed Jul. 9, 2010.

(Continued)

*Primary Examiner* — Hieu T Vo
(74) *Attorney, Agent, or Firm* — Beyer Law Group LLP

(57) ABSTRACT

A variety of methods and arrangements for improving the fuel efficiency of internal combustion engines are described. Generally, selected combustion events are skipped during operation of the internal combustion engine so that other working cycles can operate at a better thermodynamic efficiency. In one aspect of the invention, an engine is controlled to operate in a variable displacement mode. In the variable displacement mode, fuel is not delivered to the working chambers (e.g. cylinders) during selected "skipped" working cycles. During active ("non-skipped") working cycles, a maximum (e.g., unthrottled) amount of air and an optimized amount of fuel is delivered to the relevant working chambers so that the fired working chambers can operate at efficiencies closer to their optimal efficiency. A controller is used to dynamically determine the chamber firings required to provide the engine torque based on the engine's current operational state and conditions. The chamber firings may be sequenced in real time or in near real time in a manner that helps reduce undesirable vibrations of the engine.

47 Claims, 10 Drawing Sheets

U.S. PATENT DOCUMENTS

| | | | |
|---|---|---|---|
| 4,841,933 A | 6/1989 | McHale et al. | |
| 4,854,283 A | 8/1989 | Kiyono et al. | |
| 5,058,550 A | 10/1991 | Nagano et al. | |
| 5,079,691 A | 1/1992 | Heck et al. | |
| 5,275,143 A | 1/1994 | Lembke et al. | |
| 5,377,631 A | 1/1995 | Schechter | |
| 5,404,857 A | 4/1995 | Schommers | |
| 5,408,966 A | 4/1995 | Lipinski et al. | |
| 5,408,974 A | 4/1995 | Lipinski et al. | |
| 5,431,139 A | 7/1995 | Grutter et al. | |
| 5,437,253 A | 8/1995 | Huffmaster et al. | |
| 5,464,000 A | 11/1995 | Pursifull et al. | |
| 5,471,963 A * | 12/1995 | Nishioka et al. | 123/478 |
| 5,483,941 A | 1/1996 | Cullen et al. | |
| 5,540,633 A | 7/1996 | Yamanaka et al. | |
| 5,553,575 A | 9/1996 | Beck et al. | |
| 5,555,871 A | 9/1996 | Gopp et al. | |
| 5,584,281 A | 12/1996 | Katoh | |
| 5,669,357 A | 9/1997 | Denz et al. | |
| 5,692,471 A | 12/1997 | Zhang | |
| 5,752,485 A | 5/1998 | Minowa et al. | |
| 5,775,296 A | 7/1998 | Goras et al. | |
| 5,778,858 A | 7/1998 | Garabedian | |
| 5,791,314 A | 8/1998 | Ito | |
| 5,797,384 A | 8/1998 | Kitagawa et al. | |
| 5,806,488 A | 9/1998 | Imberg | |
| 5,826,563 A | 10/1998 | Patel et al. | |
| 5,945,597 A | 8/1999 | Poublan et al. | |
| 5,947,095 A | 9/1999 | Kato | |
| 5,975,052 A | 11/1999 | Moyer | |
| 6,032,650 A | 3/2000 | Rask | |
| 6,158,411 A | 12/2000 | Morikawa | |
| 6,244,242 B1 | 6/2001 | Grizzle et al. | |
| 6,247,449 B1 | 6/2001 | Persson | |
| 6,354,268 B1 | 3/2002 | Beck et al. | |
| 6,360,724 B1 | 3/2002 | Suhre et al. | |
| 6,367,443 B1 | 4/2002 | Bassai et al. | |
| 6,405,705 B1 | 6/2002 | Dunsworth et al. | |
| 6,497,221 B1 | 12/2002 | French et al. | |
| 6,606,552 B2 | 8/2003 | Haimeri et al. | |
| 6,619,258 B2 | 9/2003 | McKay et al. | |
| 6,619,267 B1 | 9/2003 | Pao | |
| 6,687,602 B2 | 2/2004 | Ament | |
| 6,688,281 B1 | 2/2004 | Woolford et al. | |
| 6,728,626 B2 | 4/2004 | Maira et al. | |
| 6,769,398 B2 | 8/2004 | Surnilla et al. | |
| 6,823,830 B2 | 11/2004 | Azuma | |
| 6,823,835 B2 | 11/2004 | Dunsworth et al. | |
| 6,868,326 B2 | 3/2005 | Yasui | |
| 6,874,462 B2 | 4/2005 | Matthews | |
| 6,876,097 B2 | 4/2005 | Thomas et al. | |
| 6,937,933 B1 | 8/2005 | Jautelat et al. | |
| 7,021,287 B2 | 4/2006 | Zhu et al. | |
| 7,028,661 B1 | 4/2006 | Bonne et al. | |
| 7,058,501 B2 | 6/2006 | Yasui et al. | |
| 7,069,910 B2 | 7/2006 | Surnilla et al. | |
| 7,111,593 B2 | 9/2006 | Song et al. | |
| 7,133,763 B2 | 11/2006 | Yasui | |
| 7,225,783 B2 | 6/2007 | Hohnstadt et al. | |
| 7,275,916 B2 | 10/2007 | Smith et al. | |
| 7,350,499 B2 | 4/2008 | Takaoka et al. | |
| 7,509,201 B2 | 3/2009 | Bolander et al. | |
| 7,516,730 B2 | 4/2009 | Ukai et al. | |
| 7,577,511 B1 | 8/2009 | Tripathi et al. | |
| 7,849,835 B2 | 12/2010 | Tripathi et al. | |
| 7,954,474 B2 | 6/2011 | Tripathi et al. | |
| 2003/0131820 A1 | 7/2003 | Mekay et al. | |
| 2003/0139872 A1 | 7/2003 | Miki | |
| 2007/0042861 A1 | 2/2007 | Takaoka et al. | |
| 2007/0162215 A1 | 7/2007 | Dietl et al. | |
| 2007/0272202 A1 | 11/2007 | Kuo et al. | |
| 2008/0066450 A1 | 3/2008 | Surnilla et al. | |
| 2008/0135021 A1 | 6/2008 | Michelini et al. | |
| 2008/0262712 A1 | 10/2008 | Duty et al. | |
| 2009/0177371 A1 | 7/2009 | Reinke | |
| 2009/0182484 A1 | 7/2009 | Loeffler et al. | |
| 2009/0182485 A1 | 7/2009 | Loeffler et al. | |
| 2009/0320787 A1 | 12/2009 | Wagner et al. | |
| 2010/0050993 A1 | 3/2010 | Zhao et al. | |

FOREIGN PATENT DOCUMENTS

| | | |
|---|---|---|
| WO | WO 91/02892 | 3/1991 |

OTHER PUBLICATIONS

Office Action dated Dec. 17, 2010 from U.S. Appl. No. 12/615,171.
U.S. Appl. No. 13/004,839, filed Jan. 11, 2011.
U.S. Appl. No. 13/004,844, filed Jan. 11, 2011.
Notice of Allowance dated Mar. 10, 2011 from U.S. Appl. No. 12/615,171.
Search Report dated Mar. 14, 2011 from International Application No. PCT/US2011/020862.
Written Opinion dated Mar. 14, 2011 from International Application No. PCT/US2011/020862.
U.S. Appl. No. 12/405,450, filed Mar. 17, 2009.
U.S. Appl. No. 12/501,345, filed Jul. 10, 2009.
U.S. Appl. No. 12/615,179, filed Nov. 9, 2009.
U.S. Appl. No. 12/615,171, filed Nov. 9, 2009.
International Search Report dated Nov. 3, 2009 in PCT Application No. PCT/US2009/050322.
Written Opinion dated Nov. 3, 2009 in PCT Application No. PCT/US2009/050322.

* cited by examiner

INTERNAL COMBUSTION ENGINE CONTROL FOR IMPROVED FUEL EFFICIENCY

CROSS REFERENCE TO RELATED APPLICATIONS

This application claims the benefit of priority to U.S. Provisional Patent Application No. 61/080,192, filed Jul. 11, 2008, entitled "INTERNAL COMBUSTION ENGINE CONTROL FOR IMPROVED FUEL EFFICIENCY," and also to U.S. Provisional Patent Application No. 61/104,222, filed Oct. 9, 2008, entitled "INTERNAL COMBUSTION ENGINE CONTROL FOR IMPROVED FUEL EFFICIENCY," both of which are incorporated herein by reference.

FIELD OF THE INVENTION

The present invention relates generally to internal combustion engines and to methods and arrangements for controlling internal combustion engines to operate more efficiently. Generally, selected combustion events are skipped during operation of the internal combustion engine so that other working cycles can operate at better thermodynamic efficiency.

BACKGROUND OF THE INVENTION

There are a wide variety of internal combustion engines in common usage today. Most internal combustion engines utilize reciprocating pistons with two or four stroke working cycles and operate at efficiencies that are well below their theoretical peak efficiency. One of the reasons that the efficiency of such engines is so low is that the engine must be able to operate under a wide variety of different loads. Accordingly, the amount of air and fuel that is delivered into each cylinder typically varies depending upon the desired torque or power output. It is well understood that the cylinders are more efficient when they are operated under specific conditions that permit full or near-full compression and optimal fuel injection levels that are tailored to the cylinder size and operating conditions. Generally, the best thermodynamic efficiency of an engine is found when the most air is introduced into the cylinders, which typically occurs when the air delivery to the engine is unthrottled. However, in engines that control the power output by using a throttle to regulate the flow of air into the cylinders (e.g., Otto cycle engines used in many cars), operating at an unthrottled position (i.e., at "full throttle") would typically result in the delivery of more power (and often far more power) than desired or appropriate.

In engines that do not generally throttle the flow of air into the cylinders (e.g., most diesel engines) power is controlled by modulating the amount of fuel delivered to the cylinders. Operating such engines at thermodynamically optimal fuel injection levels, again, would typically result in the delivery of more power than desired or appropriate. Therefore, in most applications, standard internal combustion engines are operated under conditions well below their optimal thermodynamic efficiency a significant majority of the time.

There are a number of reasons that internal combustion engines do not operate as efficiently at partial throttle. One of the most significant factors is that less air is provided to the cylinder at partial throttle than at full throttle which reduces the effective compression of the cylinder, which in turn reduces the thermodynamic efficiency of the cylinder. Another very significant factor is that operating at partial throttle requires more energy to be expended to pump air into and out of the cylinders than is required when the cylinder is operating at full throttle (these losses are frequently referred to as pumping losses).

Over the years there have been a wide variety of efforts made to improve the thermodynamic efficiency of internal combustion engines. One approach that has gained popularity is to vary the displacement of the engine. Most commercially available variable displacement engines effectively "shut down" some of the cylinders during certain low-load operating conditions. When a cylinder is "shut down", its piston still reciprocates, however fuel is not delivered to the cylinder so the piston does not deliver any power during its power stroke. Since the cylinders that are shut down don't deliver any power, the proportionate load on the remaining cylinders is increased, thereby allowing the remaining cylinders to operate at an improved thermodynamic efficiency. The improved thermodynamic efficiency results in improved fuel efficiency. Although the remaining cylinders tend to operate at improved efficiency, they still do not operate at their optimal efficiency the vast majority of the time because they are still not operating consistently at "full throttle." That is, they have the same drawbacks of partial throttle operations, (e.g., lower compression, higher pumping losses) even though the scale of their inefficiencies is reduced.

As suggested above, most commercially available variable displacement engines shut down specific cylinders (typically in pairs) to vary the displacement in discrete steps. Other approaches have also been proposed for varying the displacement of an engine to facilitate improved thermodynamic efficiency. For example, some designs contemplate varying the effective size of the cylinders to vary the engine's displacement. Although such designs can improve thermodynamic and fuel efficiencies, existing variable cylinder size designs tend to be relatively complicated and expensive to produce making them impractical for widespread use in commercial vehicles.

U.S. Pat. No. 4,509,488 proposes another approach for varying the displacement of an internal combustion engine. The '488 patent proposes operating an engine in an unthrottled manner that skips working cycles of the engine cylinders in an approximately uniform distribution that is varied in dependence on the load. A fixed amount of fuel is fed to the non-skipped cylinders such that the operating cylinders can work at near their optimum efficiency, increasing the overall operating efficiency of the engine. However, the approach described in the '488 patent never achieved commercial success. It is suspected that this was partly due to the fact that although the distribution of the skipped working strokes varied dependent on the load, a discrete number of different firing patterns were contemplated so the power outputted by the engine would not regularly match the desired load precisely, which would be problematic from a control and user standpoint. In some embodiments, the firing patterns were fixed—which inherently has the risk of introducing resonant vibrations into the engine crankshaft. The '488 patent recognized this risk and proposed a second embodiment that utilized a random distribution of the actual cylinder firings to reduce the probability of resonant vibrations. However, this approach has the disadvantage of introducing bigger variations in drive energy. The '488 patent appears to have recognized that problem and proposed the use of a more robust flywheel than normal to compensate for the resultant fluctuations in drive energy. In short, it appears that the approach proposed by the '488 patent was not able to control the engine operation well enough to attain commercial success.

Although existing variable displacement engines work well in many applications, there are continuing efforts to further improve the thermodynamic efficiency of internal combustion engines without necessarily requiring expensive alterations to the engine's design.

SUMMARY OF THE INVENTION

A variety of methods and arrangements for improving the fuel efficiency of internal combustion engines are described. Generally, selected combustion events are skipped during operation of the internal combustion engine so that other working cycles can operate at better thermodynamic efficiency.

In one aspect of the invention, an engine is controlled to operate in a variable displacement mode. In the variable displacement mode, fuel is not delivered to the working chambers (e.g., cylinders) during selected "skipped" working cycles. During active ("non-skipped") working cycles, air is delivered to the cylinders either unthrottled or at a set throttle position. An optimized amount of fuel is delivered to the relevant working chambers so that the fired working chambers can operate at efficiencies closer to their optimal efficiency. A controller is used to dynamically determine the chamber firings required to provide the engine torque based on the engine's current operational state and conditions. The chamber firings may be sequenced in a manner that helps reduce undesirable vibrations of the engine.

A variety of different controllers may be used to calculate the chamber firings required to provide the desired torque. Preferably feedback is used to insure that the engine provides a desired output and the fuel delivery pattern is dynamically determined on a working cycle by working cycle basis during operation of the engine. Adaptive predictive controllers work particularly well. One class of adaptive predictive controllers that works well in this application are sigma delta controllers. In some embodiments, the controller's clock signal is arranged to vary proportionally with the engine speed. Differential and mixed sigma delta controllers also work particularly well. In other implementations, a variety of other controllers including pulse width modulation (PWM), least means square (LMS) and recursive least square (RLS) controllers may be used to dynamically determine the desired chamber firings.

In some embodiments, a fuel processor is provided that includes a drive pulse generator arranged to receive an input indicative of a desired engine output and output a drive pulse signal that is synchronized with the engine speed. The drive pulse signal generally indicates when active working cycles are appropriate to deliver the desired engine output. In some implementations a sequencer is provided that receives the drive pulse signal and determines the actual firing pattern based at least in part on the received drive pulse signal.

In many operational conditions, the amount of fuel injected into the working chambers in the variable displacement mode is set to operate the working chambers at substantially their optimal thermodynamic efficiency under the current operational conditions. In engines that incorporate a throttle, this typically corresponds to a "full throttle" position where the throttle is fully open when air is delivered to the working chambers.

In some embodiments the controller may be arranged to sometimes cause injection of different set amounts of fuel into the fired working chambers. Injection of the different fuel quantities can be used to provide smoother and/or more precise control of the torque outputted by the engine and/or to reduce the probability of resonant vibrations occurring during operation in the variable displacement mode and/or to enhance emission characteristics.

The described approaches can be used to significantly improve the fuel efficiency of a wide variety of internal combustion engines, including 2-stroke, 4-stroke and 6-stroke piston engines, rotary engines, hybrid engines, radial engines, etc. The approach is applicable to engines that operate in accordance with a variety of different thermodynamic cycles including an Otto cycle, a diesel cycle, a Miller cycle, an Atkins cycle, mixed cycles, etc.

The various described embodiments include implementations that are well suited for use in: (a) retrofitting existing engines; (b) new engines based on current designs; and/or (c) new engine designs that incorporate other developments or are optimized to enhance the benefits of the described working cycle optimization.

The described control may be incorporated into an engine control unit (ECU) or may be provided in a separate processor or processing unit that cooperates with the engine control unit.

BRIEF DESCRIPTION OF THE DRAWINGS

The invention and the advantages thereof, may best be understood by reference to the following description taken in conjunction with the accompanying drawings in which:

FIGS. 1(a) and 1(b) are taken from *Engineering Fundamentals of the Internal Combustion Engine*, by Willard W. Pulkrabek (2004)—ISBN 0-13-140570-5;

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1A:
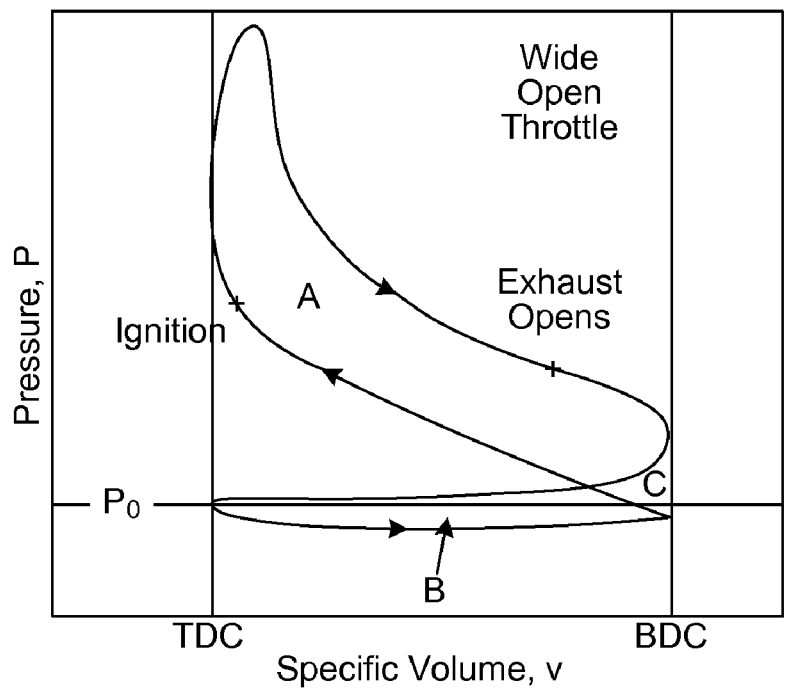
FIG. 1(a) is a pressure volume (PV) diagram illustrating the thermodynamic working cycle of a representative 4-stroke Otto cycle engine operating at full throttle.

The present invention relates generally to methods and arrangements for controlling the operation of internal combustion engines to improve their thermodynamic and fuel efficiencies. Various aspects of the invention relate to motorized vehicles that utilize such engine control and to engine control units suitable for implementing such control.

Most internal combustion engines are arranged to vary the amount of air and/or fuel that is delivered to the cylinders (or other working chambers) based on the engine output that is requested by the user or otherwise required at any given time. However, the thermodynamic efficiency of a fixed size cylinder is not the same at every air/fuel level. Rather, the thermodynamic efficiency is best when an optimal amount of air and fuel is delivered to the cylinder to achieve maximum permissible compression and optimal combustion efficiency. Since internal combustion engines need to be able to operate under a wide variety of different loads, the net result is that the engines tend to operate at lower than optimal compression or air/fuel ratios and therefore inefficiently most of the time. The present invention discloses controlling the operation of an internal combustion engine such that its working chambers (e.g., cylinders) operate under conditions close to their optimal thermodynamic efficiency most of the time.

From a theoretical standpoint, the thermodynamic efficiency of an internal combustion engine can be improved by only firing the cylinders at their optimal efficiency and then skipping working cycles that are not needed. For example, if at a given time, an engine requires 30% of the power that would be outputted by running all of its cylinders at their maximum compression and an optimized air/fuel ratio, then that power can most efficiently be generated by operating 30% of the engine's working cycles at their optimal efficiency while not fueling the cylinders the remaining 70% of the available working cycles. The general benefit of this approach was recognized by Forster et al in U.S. Pat. No. 4,509,488.

Although the '488 patent recognized the general benefits of running some working cycles at their maximum efficiency while skipping other working cycles, the described approach apparently never enjoyed any commercial success. It is suspected that this is due in part to the difficulties inherent in controlling the operation of such engines. The present application describes a number of engine designs and control arrangements for effectively controlling the operation of an engine in manners that permit some of the engine's working cycles to operate at or near their maximum efficiency while skipping other working cycles to improve the overall fuel efficiency of the engine. The various described embodiments include implementations that are well suited for use in: (a) retrofitting existing engines; (b) new engines based on current designs; and/or (c) new engine designs that incorporate other developments or are optimized to enhance the benefits of the described working cycle optimization.

Improving the thermodynamic efficiency of the engine using the described approaches can significantly improve the fuel efficiency of internal combustion engines. Computer simulation models project that the fuel efficiency of the existing fleet of fuel injected automotive gas engines on the road today could be improved by over 50% (and likely over 100%) by installing a fuel co-processor that implements the described techniques and cooperates with the car's existing engine control unit (ECU), or by replacing the ECU with an ECU that implements the described techniques. More dramatic improvements may be possible in applications where it is possible to control the fuel injection profile and/or to provide turbocharged (or supercharged) air flow (which is possible in some vehicles currently on the road) and in applications where the engine and its controller (or a fuel co-processor) are specifically designed to utilize the described techniques.

The ability to closely control the operational conditions within an engine's cylinders (or other working chambers) also opens up the possibilities of utilizing different fuels and/or fuel compositions in traditional internal combustion engines that are not practical today due to the need to operate the cylinders under widely varying loads. Operating the cylinders at their optimum efficiency also has the potential benefit of reducing the overall level of emissions of reactive species—such as nitric oxides ($NO_x$)—and other pollutants generated during operation of the engine.

To help appreciate the efficiency gains that can be attained using the described approach, it is helpful to consider the efficiency of a typical internal combustion engine. For the purpose of this illustration we can discuss an Otto cycle engine (which is the engine type used in most passenger cars on the road today). However, the advantages of the present invention are equally relevant to a wide variety of other internal combustion engines, including engines that operate using a Diesel cycle, a Dual cycle, an Atkins cycle, a Miller cycle, two stroke spark ignition (SI) engine cycles, two stroke compression ignition (CI) engines, hybrid engines, radial engines, mixed cycle engines, Wankel engines, and other types of rotary engines, etc.

Figure 1B:
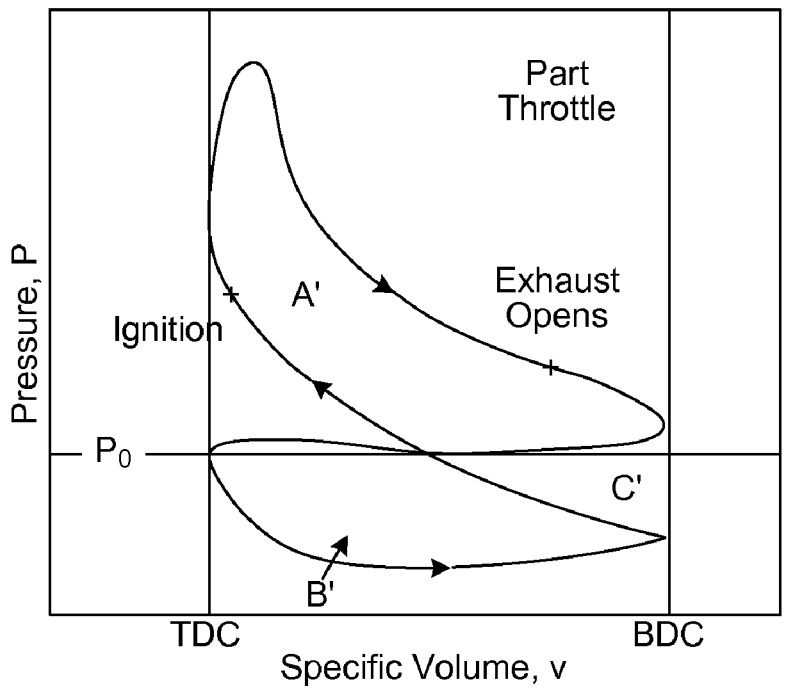
FIG. 1(b) is a pressure volume (PV) diagram illustrating the thermodynamic working cycle of a representative 4-stroke Otto cycle engine operating at partial throttle.

FIGS. 1(a) and 1(b) are PV (Pressure-Volume) diagrams illustrating the thermodynamic working cycle of a representative 4-stroke Otto cycle engine. FIG. 1(a) illustrates the performance of a cylinder at wide open throttle where the cylinder is being used at its maximum efficiency (i.e., an optimal amount of fuel is delivered to the cylinder). FIG. 1(b) illustrates the performance of a cylinder at partial throttle. Since the Otto cycle is a four stroke cycle, the piston reciprocates twice (720° rotation of the crankshaft) for each working cycle of the cylinder. Therefore, each working cycle effectively forms two loops in the PV diagram. The horizontal axis represents the volume and the range of each loop along the volume axis extends from a minimum volume—indicated as TDC (top dead center)—and a maximum volume—indicated as BDC (bottom dead center). In general, the area bounded by the upper loop (A, A') represents the amount of work that is generated by firing a cylinder, whereas the area bounded by the lower loop (B, B') represents the energy losses that are experienced due to pumping air into and out of the cylinder (these losses are frequently referred to as pumping loses). The overall work that is outputted by the engine is the difference between the area of the upper loop and the area of the lower loop.

Comparing the PV diagrams of a cylinder operating at full throttle and a cylinder operating at partial throttle, it can be seen that the overall efficiency of the cylinder operating at partial throttle is below (and often far below) the efficiency of the cylinder at full throttle. There are a number of factors that influence the operating efficiencies—but one of the biggest factors is based on the position of the throttle itself. When the throttle is partially closed, less air is provided to the cylinder. Thus, the pressure within the cylinder when the intake valve closes may be significantly below atmospheric pressure. When the starting pressure within the cylinder is significantly below atmospheric pressure, the effective compression of the cylinder during that engine cycle is reduced, which significantly lowers the pressure that builds up during the combustion stoke and reduces the amount of work generated by the firing of the cylinder. This can be seen by comparing the area of loop A—which is the work generated by a cylinder operating at full throttle—to the area of loop A'—which is the work generated by the cylinder operating at partial throttle. Additionally, the fact that the throttle is partially closed makes it harder to draw air into the cylinder, so pumping losses increase. This can be seen by comparing the area of loop B—which is the pumping loss experienced by the cylinder operating at full throttle—to the area of loop B'—which is the pumping loss experienced by the cylinder operating at partial throttle. By subtracting B from A and B' from A', it can be seen that the net work generated by the engine operating at full throttle is much greater than the net work generated by the engine operating at partial throttle—even when an adjustment is made to compensate for the fact that the partial throttle operation uses less fuel.

Although the comparison illustrated above is for an Otto cycle engine, it should be appreciated that similar types of efficiency losses are experienced by internal combustion engines operating on other thermodynamic cycles when they are operated at less than their optimal efficiency (which typically corresponds to unthrottled air delivery combined with combustion at a thermodynamically optimal air/fuel ratio).

In various embodiments of the invention, the thermodynamic efficiency of an internal combustion engine is improved by operating the engine in a variable displacement mode in which some of the working chambers are operated at (or close to) their optimal thermodynamic efficiency while skipping working cycles that are not needed.

Firing Control Unit

Figure 2A:
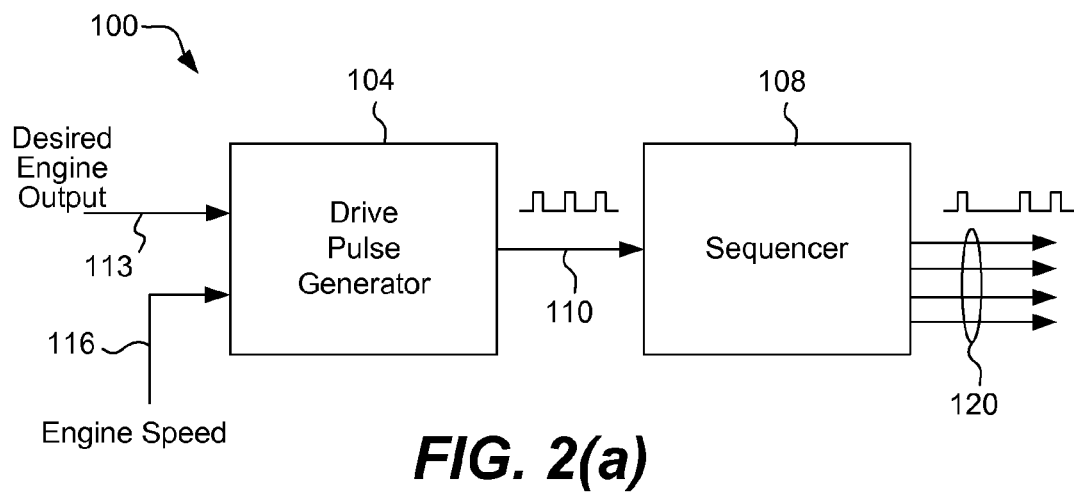
FIG. 2(a) is a functional block diagram that diagrammatically illustrates a control unit that is suitable for operating an engine in accordance with one embodiment of the present invention.

FIG. 2(a) is a functional block diagram that diagrammatically illustrates a control unit that is suitable for operating an engine in accordance with one embodiment of the present invention. In the primary described embodiment the controlled engine is a piston engine. However, the described control is equally applicable to other engine designs. In the illustrated embodiment, a firing control unit 100 includes a drive pulse generator 104 and a sequencer 108. An input signal 113 that is indicative of a desired engine output is provided to the drive pulse generator 104. The drive pulse generator 104 can be arranged to use adaptive predictive control to dynamically calculate a drive pulse signal 110 that generally indicates when cylinder firings are required to obtain the desired output. As will be discussed in more detail below, the controller may be synchronized with the engine speed (input signal 116) so that the generated drive pulse pattern is appropriate to deliver the power desired at the current engine speed—which may be constantly changing. The drive pulse signal 110 may then be provided to a sequencer that orders the pulses to provide the final cylinder firing pattern 120. Generally, the sequencer 108 is arranged to order the firing pattern in a manner that helps prevent excessive or inappropriate vibration within the engine. As is well known in the engine design field, the order that cylinders are fired can have a significant effect on vibrations within many engines. Therefore, as will be described in more detail below, the sequencer is designed to help insure that vibrations generated by the operation of the engine are within design tolerances. If a particular engine can be run using an arbitrary firing pattern (i.e., the cylinders can be fired in any pattern without generating undue vibrations), then the sequencer could potentially be eliminated and the drive pulse signal 110 could be used to dictate the firing pattern.

In a first implementation, each cylinder that is fired is operated at or near its optimal thermodynamic efficiency. That is, air and fuel are introduced into the cylinder in amounts that allow the most work to be obtained from the cylinders per unit of fuel burnt while still meeting other constraints on the engine (such as emissions requirements, the effects of the combustion on engine life, etc.). In most throttled engines, this corresponds approximately to a "full throttle" position, which permits the most air to be introduced to the cylinder. Many vehicles include engine control units (ECUs) that determine (among many other things) the desired air/fuel ratios and the amount of fuel to be injected for each cylinder firing. Often the ECUs have lookup tables that identify the desired air fuel ratios and/or fuel injection amounts for a number of different operating conditions (e.g., different throttle positions, engine speeds, manifold air flow, etc.) based on various current ambient conditions (including air pressure, temperature, humidity etc.). In such vehicles, the amount of fuel that the firing control unit causes to be injected into each cylinder in the continuously variable displacement mode may be the value stored in the fuel injection lookup table for operating the cylinder at full throttle under the current conditions.

The desired output signal 113 may come from any suitable source that can be considered a reasonable proxy for a desired engine output. For example, the input signal may simply be a signal indicative of accelerator pedal position taken directly or indirectly from an accelerator pedal position sensor. Alternatively, in vehicles that do not have electronic accelerator position sensors but have a throttle, a signal indicative of desired throttle position may be used in place of the accelerator position signal. In vehicles that have a cruise control feature, the input signal 113 may come from a cruise controller. In still other embodiments, the input signal 113 may be a function of several variables in addition to accelerator position. In other engines, that have fixed operational states, the input signal 113 may be set based on a particular operational setting. In general, the desired output signal may come from any suitable source that is available in the vehicle or engine being controlled.

The drive pulse generator 104 is generally arranged to determine the number and general timing of cylinder firings that are required to generate the desired output given the current operating state and operating conditions of the engine. The drive pulse generator uses feedback control, such as adaptive predictive control to determine when cylinders must be fired to deliver the desired engine output. Thus, the drive pulse signal 110 outputted by the drive pulse generator 104 effectively indicates the instantaneous displacement required by the engine to deliver the desired engine output. The displacement required by the engine will vary with operating conditions and can be based on both what has happened in the past and what is predicted for the immediate future. In various embodiments, the drive pulse generator 104 is generally not constrained to limit fluctuations in the number of cylinder firings that are required per revolution of the crankshaft to deliver the desired output. Thus, the effective displacement of the engine can be continuously varied by selecting which cylinders to fire and which cylinders not to fire, on a firing opportunity by firing opportunity basis. This is very different than conventional commercially available variable displacement engines where rapid fluctuations between different displacements, and particularly different cylinder firing patterns, are considered undesirable (see, e.g., U.S. Pat. No. 5,408,974). This ability to continuously vary the effective displacement of the engine is sometimes referred to herein as a continuously variable displacement mode of operation.

A variety of different control schemes can be implemented within the drive pulse generator 104. Generally, the control schemes may be implemented digitally, algorithmically, using analog components or using hybrid approaches. The drive pulse generator may be implemented on a processor, on programmable logic such as an FPGA, in circuitry such as an ASIC, on a digital signal processor (DSP), using analog components, etc.

One class of controllers that is particularly well suited for use in the drive pulse generator is adaptive predictive controllers. As will be appreciated by those familiar with control theory, adaptive predictive controllers are adaptive in that they utilize feedback to adapt or change the nature of their output signal based on the variance of the output signal from a desired output signal and predictive in that they are integrative so that past behavior of the input signal affects future output signals.

A variety of different adaptive predictive controllers may be used to calculate the chamber firings required to provide the desired output. One class of adaptive predictive controllers that work particularly well in this application is sigma delta controllers. The sigma delta controller may utilize sample data sigma delta, continuous time sigma delta, algorithm based sigma delta, differential sigma delta, hybrid analog/digital sigma delta arrangements, or any other suitable sigma delta implementation. In some embodiments, the sigma delta controller's clock signal is arranged to vary proportionally with the engine speed. In other implementations, a variety of other adaptive predictive controllers including pulse width modulation (PWM), least means square (LMS) and recursive least square (RLS) controllers may be used to dynamically calculate the required chamber firings.

Figure 2B:
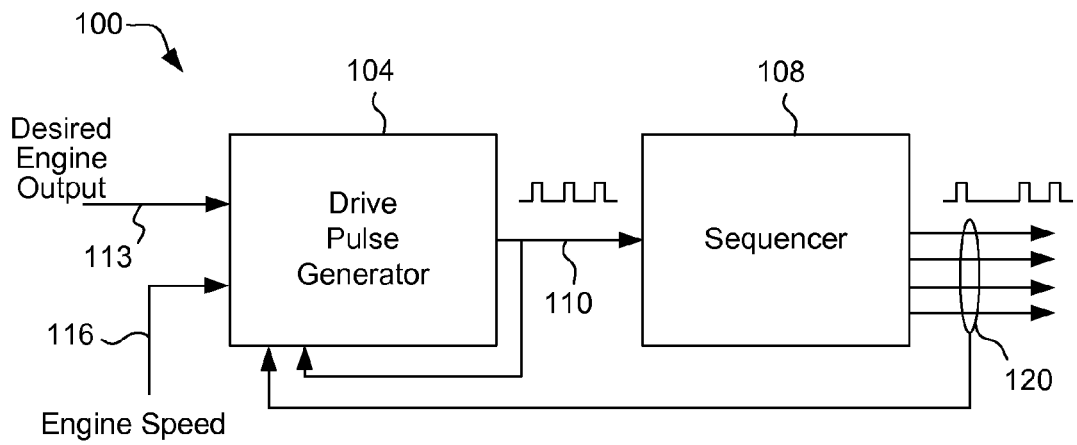
FIG. 2(b) is a functional block diagram of the control unit of FIG. 2(a) that diagrammatically illustrates selected feedback that may be used by the drive pulse generator in some embodiments of the present invention.

The drive pulse generator 104 preferably uses feedback control in determining when drive pulses are appropriate to deliver the desire engine output. Components of the feedback may include feedback of the drive pulse signal 110 and/or feedback of the actual cylinder firing pattern 120 as generally illustrated in FIG. 2(b). Since the drive pulse signal 110 indicates when working chamber firings are appropriate, it may generally be thought of as a signal indicative of requested firings. The sequencer then determines the actual timing of the requested firings. When desired, the information fed back from the actual firing pattern 120 may include information indicative of the firing pattern itself, the timing of the firings, the scale of the firings and/or any other information about the cylinder firings that is desired by or useful to the drive pulse generator 104. Generally, it is also desirable to provide the drive pulse generator 104 with an indication of the engine speed 116 so that the drive pulse signal 110 can generally be synchronized with the engine.

Figure 2C:
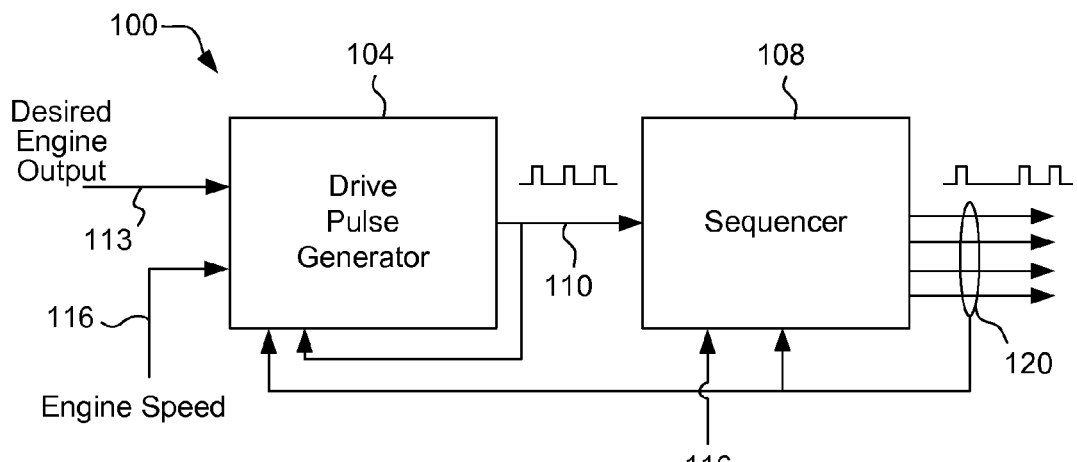
FIG. 2(c) is a functional block diagram of the control unit of FIG. 2(b) that diagrammatically illustrates selected feedback that may be used by the sequencer in some embodiments of the present invention.

Various feedback may also be provided to the sequencer 108 as desired. For example, as illustrated diagrammatically in FIG. 2(c), feedback or memory indicative of actual firing timing and/or pattern 120 may be useful to the sequencer to allow it to sequence the actual cylinder firings in a manner that helps reduce engine vibrations.

Sigma-Delta Control Circuit

Figure 3:
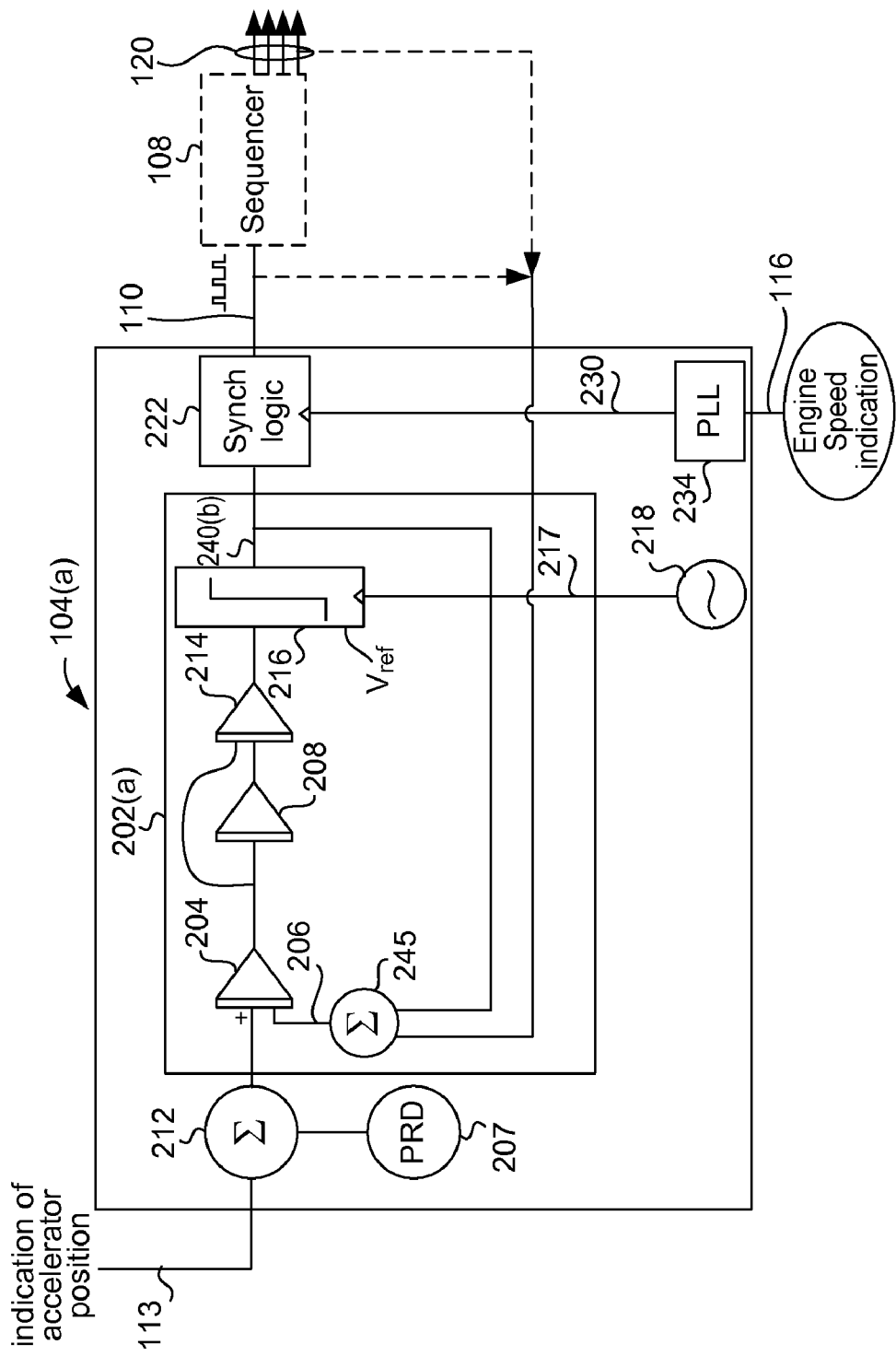
FIG. 3 is a block diagram of a sigma-delta control circuit based drive pulse generator suitable for use with some embodiments of the invention.

Referring next to FIG. 3, one implementation of a sigma-delta control based drive pulse generator 104 will be described. The drive pulse generator 104 includes a sigma-delta controller 202 and a synchronizer 240. The sigma-delta controller 202 utilizes principles of sigma-delta conversion, which is a type of oversampled conversion. (Sigma-delta conversion is also referred to as delta-sigma conversion.) The basic theory of sigma-delta conversion has been described in what is commonly referred to as a seminal reference on the subject: H. Inose, Y. Yasuda, and J. Murakami, "A Telemetering System by Code Modulation: Δ-Σ Modulation," IRE Transactions on Space Electronics Telemetry, Vol. SET-8, September 1962, pp. 204-209. Reprinted in N. S. Jayant, Waveform Quantization and Coding, IEEE Press and John Wiley, 1976, ISBN 0-471-01970-4.

The illustrated sigma-delta control circuit 202($a$) is a third order sigma-delta circuit generally based on an architecture known as the Richie architecture. Sigma-delta control circuit 202($a$) receives an analog input signal 113 that is indicative of a desired output (which might be thought of as desired work output or desired torque). Since sigma-delta controllers of the type illustrated are generally known and understood, the following description sets forth the general architecture of a suitable controller. However, it should be appreciated that there are a wide variety of different sigma-delta controllers that can be configured to work very well for a particular implementation.

In the illustrated embodiment, the input signal 113 is indicative of accelerator pedal position (although as described above, other suitable input signals indicative of, or proxies for, desired output may be used as well). The input signal 113 is provided as a positive input to the sigma-delta control circuit 202($a$), and particularly to a first integrator 204. The negative input of the integrator 204 is configured to receive a feedback signal 206 that is a function of the output such that the operation of the sigma delta control circuit 202($a$) is adaptive. As will be described later, the feedback signal 206 may actually be a composite signal that is based on more than one output stage. The integrator 204 may also receive other inputs such as dither signal 207 which also will be described in more detail below. In various implementations some of the inputs to integrator 204 may be combined prior to their delivery to the integrator 204 or multiple inputs may be made directly to the integrator. In the illustrated embodiment, the dither signal 207 is combined with the input signal 113 by an adder 212 and the combined signal is used as the positive input. The feedback signal 206 is a combination of feedback from the output of the sigma delta control circuit and the controlled system, which in the illustrated embodiment is shown as feedback representing either the drive pulse pattern 110 or the actual timing of the firings or a combination of feedback from both.

The sigma delta control circuit 202($a$) includes two additional integrators, integrator 208 and integrator 214. The "order" of the sigma delta control circuit 202($a$) is three, which corresponds to the number of its integrators (i.e., integrators 204, 208 and 214). The output of the first integrator 204 is fed to the second integrator 208 and is also fed forward to the third integrator 214.

The output of the last integrator 214 is provided to a comparator 216 that acts as a one-bit quantizer. The comparator 216 provides a one-bit output signal 219 that is synchronous with a clock signal 217. Generally, in order to insure very high quality control, it is desirable that the clock signal 217 (and thus the output stream of the comparator 216) have a frequency that is many times the maximum expected firing opportunity rate. Typically, the output of the comparator should oversample the desired drive pulse rate by a factor of at least about 10 and oversampling factors on the order of at least about 100 are generally preferred. That is, the output of the comparator 216 should be at a rate of at least 10 times and preferably at least 100 times the rate at which engine firing opportunities occur. The clock signal 217 provided to the comparator 216 may come from any suitable source. For example, in the embodiment shown in FIG. 3, the clock signal 217 is provided by a crystal oscillator 218.

It should be appreciated that these clock rates are actually relatively slow for modern digital electronic systems and are therefore readily obtainable and usable. For example, if the controlled engine is a eight-cylinder engine that operates using a four stroke working cycle, then the maximum firing opportunity rate expected might be something on the order of 8,000 RPM×8 cylinders×½. The factor of ½ is provided because, in a normally-operating four-cycle engine, each cylinder has a firing opportunity only once every two revolutions of the engine crankshaft. Thus, the maximum expected frequency of firing opportunities may be approximately 32,000 per minute, or about 533 per second. In this case, a clock operating at about 50 kHz would have nearly 100 times the maximum expected rate of firing opportunities. Therefore, a fixed clock having a clock frequency of 50 kHz or greater would work very well in that application.

In other embodiments, the clock used to drive the comparator may be a variable clock that varies proportionally with engine speed. It is believed that the use of a variable speed clock in a sigma delta controller is different than conventional sigma delta controller design. The use of a variable speed clock has the advantage of insuring that the output of the comparator is better synchronized with the engine speed and thus the firing opportunities. The clock can readily be synchronized with the engine speed by utilizing a phase lock loop that is driven by an indication of engine speed (e.g., a tachometer signal). Some of the advantages of using a variable speed clock that is based on engine speed will be discussed further below with respect to FIG. 7.

The one-bit output signal 240 outputted from the comparator 216 is generated by comparing the output of the integrator 214 with a reference voltage. The output is effectively a string of ones and zeros that is outputted at the frequency of the clock. The output 240 of the comparator 216 (which is the output of the sigma delta control circuit 202(a)) is provided to a synchronizer 122 that is arranged to generate the drive pulse signal 110. In the illustrated embodiment, the sigma delta control circuit 202(a) and the synchronizer 122 together constitute a drive pulse generator 104 (FIG. 2).

The synchronizer 122 is generally arranged to determine when drive pulses should be outputted. The drive pulses are preferably arranged to match the frequency of the firing opportunities so that each drive pulse generally indicates whether or not a particular working cycle of a working chamber should be exercised. In order to synchronize the drive pulse signal 110 with the engine speed, the synchronizer 122 in the embodiment illustrated in FIG. 3 operates using a variable clock signal 230 that is based on engine speed. A phase-locked loop 234 may be provided to synchronize the clock with the engine speed. Preferably, the clock signal 230 has a frequency equal to the desired frequency of the outputted drive pulse signal 110. That is, it is preferably synchronized to match the rate of firing opportunities.

The output signal 240 of the sigma-delta control circuit is generally a digital representation of the analog input signal 113 that is received by the sigma-delta control circuit 202(a). Because (a) the input signal is effectively treated as a desired output, or a desired work output, and (b) the combustion within the working chambers is controlled such that a generally known and relatively constant amount of work is produced by each engine firing—when the digital output signal 240 from the sigma delta control circuit 202(a) contains a certain number of "high" symbols it is appropriate to generate a positive drive pulse (i.e., to order the firing of a working chamber). Thus, conceptually, a purpose of the synchronizer 122 can be thought of as being to count the number of high symbols in the output signal and when enough symbols are counted, sending a drive pulse that is synchronized with the engine speed. In practice, true counting is not actually required (although it can be done in some implementations).

Another characteristic of the output of the described sigma-delta control circuit with a high oversampling rate when used in this type of engine control application is that the controller tends to emit long blocks of high signals followed by blocks of low signals. This characteristic of the output signal 240 can be used to simplify the design of the synchronizer 122. In one implementation, the synchronizer merely measures the length (i.e., time or period) of the blocks of high signals emitted in output signal 240. If the length of the block of high signals exceeds a designated threshold, a drive pulse is generated. If the length of a block of high signals doesn't exceed the threshold—no drive pulses are generated based on that block of high signals. The actual thresholds that are used can be widely varied to meet the needs of a particular design. For example, in some designs the threshold can be the period of the clock signal 230 which (since the clock is synchronized with the engine speed) corresponds to the duty cycle of the drive pulse pattern 110 and the average delay between working chamber firing opportunities. With this arrangement, if the length of a block of high signals is less than one duty cycle, no drive pulses are generated corresponding to the block; if the length of the block exceeds one duty cycle and is less than two duty cycles, then one drive pulse is generated; if it exceeds two duty cycles but is less than three duty cycles, then two sequential drive pulses are generated; and so on.

It should be appreciated that with this arrangement, the "length" or time duration of a burst of high outputs from the sigma-delta control circuit will have to be longer in order to trigger a drive pulse when the engine speed is low than the length of a burst would need to be in order to trigger a drive pulse when the engine speed is high. That is because the duty cycle of the drive pulse signal is longer at lower engine speeds.

In other implementations, the threshold may be set differently. For example, the thresholds might be set such that any block of high outputs having a length that exceeds some designated percentage (e.g., 80 or 90 percent) of the duty cycle of the drive pulse signal causes a drive pulse to be generated, while shorter pulse lengths are effectively truncated.

At first review it may seem that ignoring portions of pulses in the manner suggested above could degrade the performance of the control system to an unacceptable level. However, for many engines, the high frequency of the firing opportunities and the responsiveness of the control system in general make it perfectly acceptable to use such simple synchronizers. Of course, it should be appreciated that a wide variety of other synchronization schemes can be used as well.

As mentioned above, the sigma-delta control circuit is arranged to provide feedback to the first integrator. In the illustrated embodiment, the feedback signal 206 is a composite of: (a) feedback from the output 240 of the comparator 216; (b) the drive pulse pattern 110 outputted by the synchronizer 122; and/or (c) the actual firing pattern 120. A combiner 245 is arranged to combine the feedback signals in the desired ratios. The relative ratios or weights given to the various feedback signals that are fed back to the first integrator 204 may be varied to provide the desired control.

It should be appreciated that although the comparator output, the drive pulse signal and the actual firing pattern are all related—their timing will vary and the general magnitude of the comparator output may differ from the others. The most accurate feedback in terms of reflecting actual engine behavior is the firing pattern—however, there can be significant time delays (from the standpoint of the sigma-delta control circuit 202) between the output of the comparator and the actual firing of a working chamber. The next best feedback in terms of reflecting actual engine behavior is the drive pulse signal. Thus, in many implementations it will be desirable to heavily weight the feedback towards the drive pulse signal and/or the firing pattern. However, in practice, the performance of the sigma delta controller can often be enhanced by feeding back some portion of the comparator output signal 240. By way of example, in some implementations, weighting the feedback of the comparator output signal 240 at in the range of 15-25% of the total feedback signal 206 with the remainder being a reflection of the drive pulse signal or the firing pattern or a combination of the two should work appropriately. Of course, these ratios are just exemplary and the appropriate, preferred and optimal feedback percentages will vary in accordance with the particular implementation of the firing control unit 100 and the associated engine.

In some embodiments, it may be desirable to anti-aliasing filter the input signal 113 and the feedback signal 206. The anti-aliasing functionality can be provided as part of the sigma-delta control circuit 202 or it may be provided as an anti-aliasing filter that precedes the sigma delta control circuit or it may be provided in any other suitable form. In the third order analog continuous time sigma-delta control circuit 202(a) illustrated in FIG. 3, the first integrator 204 provides the anti-aliasing functionality. That is, it effectively acts as a low pass filter.

Another known characteristic of sigma delta controllers is that they sometimes generate "tones" which are cyclic variations in the output signal relative to the input signal. Such tones are particularly noticeable when the analog input signal 113 varies slowly, which is often the case when driving and in many other engine control applications. The presence of such tones within the comparator output signal 240 may be reflected in the engine firing pattern. In some situations, there is a risk that such cyclic variations in the drive pattern can generate undesirable resonances within the engine which may generate undesirable vibration patterns. In extreme cases, the tones could even be manifested as a noticeable fluctuation in drive energy. Accordingly, various arrangements may be provided in an effort to help prevent and/or break up such tones.

One option that can help prevent and/or break up tones in the sigma-delta controller output is to combine the input signal 113 with a noise signal that averages to zero over time, but whose local variations tend to break up the tones in the output signal of the sigma delta controller. In signal processing applications such a noise signal is often referred to as "dither." In the embodiment illustrated in FIG. 3 the adder 212 combines the input signal 113 with such a dither signal 246. A pseudo-random dither generator (PRD) 226 may be employed to generate the dither signal, but it should be appreciated that dither can be introduced using a wide variety of other approaches as well.

The output of the synchronizer 122 is the drive pulse signal 110 discussed above with respect to FIG. 2. As discussed above, the drive pulse signal 110 effectively identifies the cylinder firings (or instantaneous effective engine displacement) that is needed to provide the desired engine output. That is, the drive pulse signal 110 provides a pattern of pulses that generally indicates when cylinder firings are appropriate to provide the desired or requested engine output. In theory, the cylinders could be fired directly using the timing of the drive pulse signal 110 outputted by the synchronizer 122. However, in many cases it will not be prudent to fire the cylinder using exactly the same timing as pulse pattern 110 because this could generate undesirable vibrations within the engine. Accordingly, the drive pulse signal 110 may be provided to a sequencer 108 which determines an appropriate firing pattern. The sequencer 108 is arranged to distribute the cylinder firings called for in a manner that permits the engine to run smoothly without generating excessive vibrations. The control logic used by the sequencer 108 to sequence the cylinder firings may be widely varied and the sophistication of the sequencer will depend in large part on the needs of a particular application.

Sequencer

Figures 4, 5:
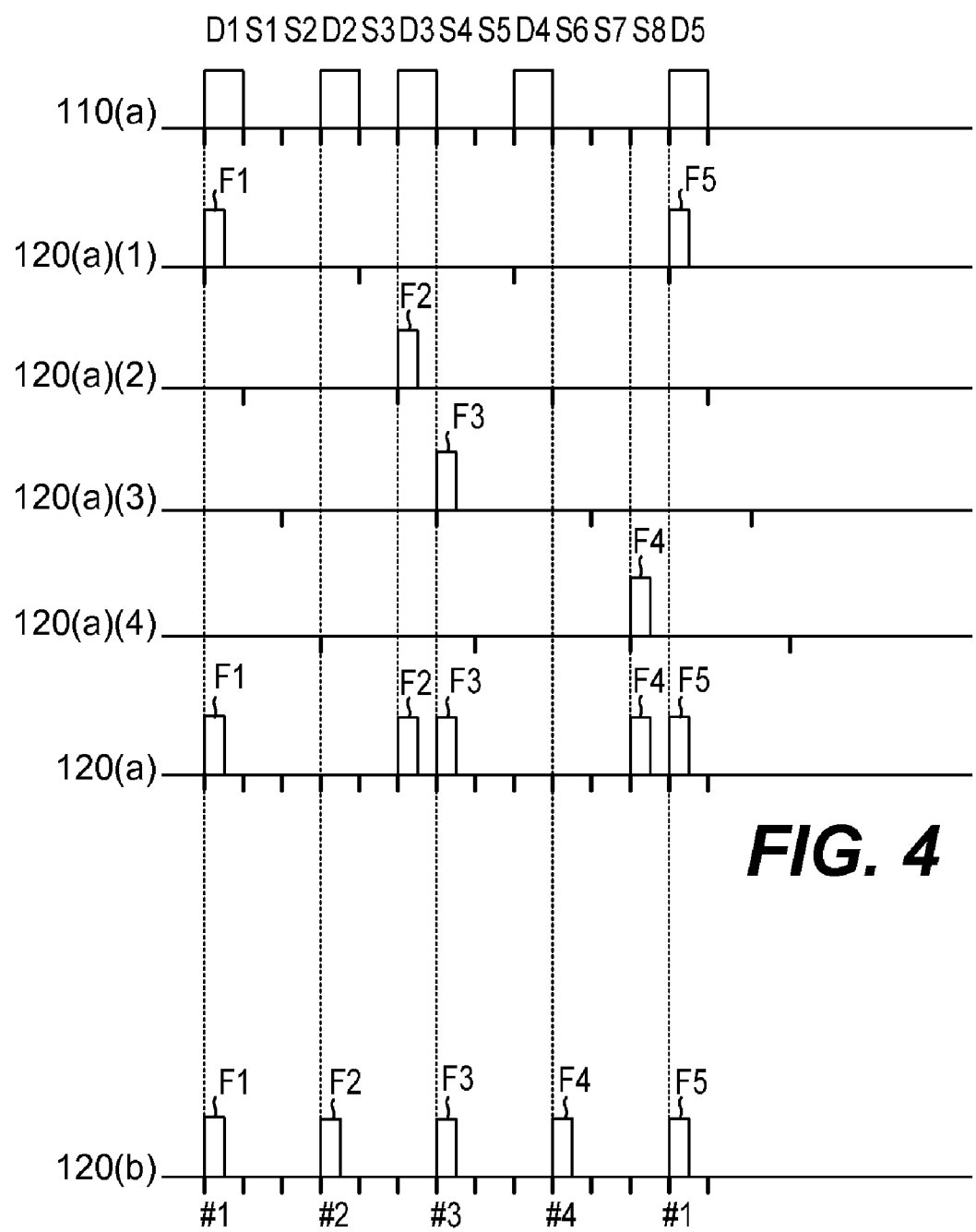
FIG. 4 is a timing diagram illustrating a representative drive pulse pattern and a set of corresponding cylinder firing patterns generated by an embodiment of a sequencer.
FIG. 5 is a timing diagram illustrating a firing pattern generated by a second sequencer embodiment in response to the drive pulse pattern illustrated in FIG. 4.

Referring next to FIG. 4 the operation of a relatively simple embodiment of sequencer 108 will be described that is suitable for many applications. Piston engines in use today operate their cylinders in a fixed sequence. For the purposes of illustration, consider a standard four-cylinder engine. The four cylinders are labeled "1," "2," "3" and "4" by the order in which they would be fired in "normal" operation of the engine (i.e., operation without control to skip working cycles of the engine). It should be appreciated that this order may not, and generally does not, coincide with the physical placement of the cylinders in the engine. The simple sequencer 108(a) may be configured to fire the cylinders in exactly the same order that they would be fired in normal operation. That is, if cylinder #1 is fired, then the next cylinder fired will be #2, then #3, #4, #1, #2, #3, #4, #1, etc.

FIG. 4 is a timing diagram that illustrates a possible drive pulse signal 110(a) inputted to the sequencer 108, the corresponding firing patterns 120(a-1), 120(a-2), 120(a-3), and 120(a-4), outputted by the sequencer for each of the cylinders, and the composite firing pattern 120(a) outputted by the sequencer. The signals are all clocked at the rate of cylinder firing opportunities, which is twice the RPM with a 4 cylinder, 4-stroke engine. In the pattern illustrated in FIG. 4 the inputted drive pulse signal calls for a first cylinder firing D1, then two skips (S1, S2), a second firing D2, another skip (S3), a third firing D3, two more skips (S4, S5), a fourth firing D4 and three more skips (S6-S8). Since cylinder #1 is available when the first firing D1 is requested, it is fired as indicated by F1 in pattern 120(a-1). The next two firing opportunities (cylinders #2 & #3) are skipped in accordance with skips S1 and S2 in the input pulse pattern 110(a). The second firing D2 is requested at a time when only cylinder #4 is available—but assuming that the sequencer 108(a) is designed to fire the cylinders in a designated (e.g. normal or conventional) order, it fires cylinder #2 the next time it is available as seen in pattern 120(a-2) (this corresponds to overall firing opportunity #6). Thus D2 is effectively delayed until cylinder #2 is available and no other cylinders are fired before cylinder #2 comes around, regardless of whether additional firings are requested as can be seen as firing F2 in pattern 120(a-2).

The drive pulse input signal 110(a) called for a third firing D3 at the sixth firing opportunity. The sequencer 108 allocates this firing to cylinder #3 which is not yet available (only cylinder #2 is then available) so F3 is delayed until cylinder #3 becomes available—which in the illustrated example is the next firing opportunity. The sequencer 108(a) continues to operate using this approach throughout operation in the variable displacement mode. It should be appreciated that the number of firings F instructed by the sequencer 108(a) are identical to the number of drive pulses D received—only the timing has been varied slightly in order to help balance the engine and more uniformly utilize each of the cylinders over time. It is believed that even this very simple sequencer logic will suffice to adequately balance the engine in many implementations that utilize the described sigma-delta control circuit 202 due to the pseudo-randomness of the drive pulse signal 110 generated by the sigma-delta controller. This is particularly true when a reasonable dither is fed into the combiner 212. The fact that the firing pattern 120 is not exactly the same as the drive pulse signal 110 generated by the drive pulse generator 104 may further help break up any tones that might be generated by the drive pulse generator 104.

It is noted that delaying the cylinder firing relative to the drive pulses theoretically makes the engine slightly less responsive to changes in the accelerator pedal position than would be the case if the drive pulses were used to directly control the cylinder firing. However, in practice, this delay may be inconsequential. For example, in a four cylinder engine operating at 3000 RPM, there are 6000 firing opportunities a minute—one hundred a second. Thus, the maximum delay—which would be three firing cycles—would be approximately three-hundredths of a second. Given the cylinder firing rates and the overall mass of the vehicle relative to the energy provided by one firing, delays of this scope will generally be imperceptible to the operator in motor vehicle applications.

A constraint on the first embodiment of the sequencer discussed above is that the cylinders are fired in a fixed order—even when firing opportunities are skipped. However, this is not a requirement in all engine designs. In many applications, it may be perfectly acceptable to have varying firing sequences. For example, in some implementations it might be appropriate to constrain the sequencer to specific "follow patterns." That is, after a particular cylinder is fired, only a set of designated cylinders may be fired next. For example, in an 8-cylinder engine, it may be perfectly acceptable for cylinder 2 or cylinder 6 to follow cylinder 1, and either cylinder 3 or 7 to follow cylinder 2, etc. (In practice even more varied follow patterns can often work effectively). It should be apparent that the sequencer logic can readily be configured to permit these types of fixed firing sequence constraints. By way of example, FIG. 5 illustrates a firing pattern 120(b) generated by a second embodiment of the sequencer which allows cylinders 2 or 4 to follow 1 or 3 and vice versa. The firing pattern 120(b) is generated from the same drive pulse signal 110(a) as illustrated in FIG. 4. It can be seen although the same number of cylinder firings are generated in both embodiments, their respective timing may differ due to differences in the sequencer logic. The actual follow patterns that are appropriate for a particular engine will be highly dependent on the nature of the engine design (e.g., V-block or in-line; number of cylinders, etc., rotational offset of the pistons, etc.) and the vibration analyses necessary to make these determinations are well understood.

Of course, the sequencer 108 can be designed to integrate more sophisticated follow patterns. For example, the last two, three or more firings may be considered in determining which cylinders are available for firing next. In other embodiments, the follow patterns may be a function of engine speed and/or other factors as well.

In still other embodiments, the sequencer 108 does not need to be constrained to specific follow patterns. Rather, the firing pattern can be determined or calculated using any criteria that are appropriate for the engine being controlled. The sequencer 108 may include memory to facilitate more sophisticated analysis and/or may be adapted or programmed to recognize and interrupt undesirable firing patterns that are known to or likely to introduce undesirable vibration into the engine operation. Alternatively or additionally, the sequencer may employ real time vibration analysis that takes into account a variety of factors that might be considered appropriate—including, for example, the rotational speed of the engine, the presence and/or effects of skipped or partial energy working cycles, etc. to appropriately sequence the necessary cylinder firings.

The sequencer can also be designed to address any other design criteria that are deemed important or desirable for a particular engine. For example, to help prolong engine life, it might be desirable to design the sequencer such that all of the working chambers are fired substantially the same amount over time during operation in the variable displacement mode.

As will be apparent to those with experience in electronic control, the logic of the described sequencers can very readily be implemented in digital logic, algorithmically, using analog components or in a variety of combinations of these approaches. Although only a few sequencer logics have been described, it should be appreciated that the logic of the sequencer 108 may be very widely varied to meet the needs of any particular implementation.

Air/Fuel Ratios

Many engines are characterized by engine performance maps which model the characteristics of the engine with different engine speeds, loads and other operating conditions. A feature of the described control is that the amount of fuel delivered during each chamber firing can be arranged to match any desired point on the engine performance map. In some circumstances it may be desirable to provide a lean air/fuel ratio, while in others it may be desirable to provide a rich air/fuel ratio.

In most conventional engines, the actual amount of air and fuel delivered to a working chamber is a function of the engine's current operational state. The amount of fuel delivered to a working chamber during a particular working cycle will depend heavily on the amount of air that is delivered to the working chamber. It will also depend in part on the desired air/fuel ratio. The actual amount of air delivered to a chamber during a particular working cycle will vary depending on operational and environmental factors such as throttle position, current engine speed, manifold air pressure, etc. Generally, the amount of air delivered to a cylinder at a particular throttle position will be less at high engine speeds than it is at low engine speeds in part because the intake valve tends to be open for a shorter period of time when the engine is operating a high RPM.

Modern engine control units receive inputs from a number of sensors that permit the engine control unit (ECU) to monitor the operational state of the engine. By way of example, the sensors may include a mass of air flow sensor (MAF sensor), an ambient air temperature sensor, an engine coolant temperature sensor, a manifold air pressure sensor, an engine speed sensor, a throttle position sensor, etc. The ECU interprets the sensor inputs in order to calculate the appropriate amount of fuel to be injected and controls engine operation by manipulating the fuel and/or air flow. The actual amount of fuel injected depends on the engine's operational state and environmental conditions including variables such as engine and ambient temperatures, engine speed and workload, throttle position, exhaust gas composition, etc. Generally, an extensive amount of effort and analysis is undertaken in order to define an optimal or desired amount of fuel to be provided to cylinders under different operational conditions. Often these efforts result in the development of multi-dimensional maps that define the appropriate amount of fuel to be injected for specific operating conditions. The fuel injection maps are often reflected in lookup tables stored in the ECU. The ECU then uses the lookup tables to determine the appropriate amount of fuel to inject into a working chamber based upon the current operational state of the engine.

When developing the fuel injection maps, a variety of factors may be considered in determining the optimal (or otherwise desired) amount of fuel to deliver for a given amount of air introduced to the cylinder. These factors may include the effects on fuel efficiency, power output, emissions control, fuel ignition, etc. These analyses necessarily have to make some estimates and/or assumptions regarding relevant factors that may not be precisely known or controllable (e.g., properties of the fuel such as the octane or energy content of the fuel). Therefore, the "optimized" amount of fuel that is delivered for a given amount of air and/or the optimized air/fuel ratios are not fixed values. Rather, they may vary between engines and/or between operational states of the same engine based on the performance parameters that are considered important for that engine or operational state. These design choices are typically reflected in the fuel injection maps utilized by the ECUs. Further, many ECUs are designed to dynamically adjust the air/fuel ratios based on feedback received from various sensors such as the exhaust gas lambda (oxygen) sensor.

The same considerations may be taken into account when operating in the continuously variable displacement mode. In many implementations, the throttle position in the continuously variable displacement mode will be fixed (e.g., wide open). However, it should be appreciated that the actual mass of the air that is introduced into the working chamber will not always be the same even when the air delivery is unthrottled due to differences in the operational state of the engine and environmental conditions. For example, at higher engine speeds, less air may actually enter a cylinder during a particular working cycle than would enter the same cylinder at lower engine speeds. Similarly, at sea level, more air will typically enter a cylinder than would occur at high elevations at the same engine speed. Other factors will affect the amount of air introduced into the cylinder as well. Preferably, these factors are taken into account when determining how much fuel to deliver during any particular working cycle. Further, factors such as the desired air/fuel ratio may be taken into account when determining the amount of fuel to deliver. The desired air/fuel ratio may also vary dynamically based on the operational state of the engine. In some circumstances, it may be desirable to use lean air/fuel mixtures, whereas in other operational states it may be desirable to utilize richer air/fuel mixtures.

The determination of the amount of fuel to deliver during any particular optimized firing can readily be accomplished by using the same (or more simplified) types of fuel injections maps that are used today. A difference for throttled engines being that only one (or a limited number) of throttle positions would need to be considered. When retrofitting existing engines, the existing fuel injection maps can typically be used for this purpose. Of course, as the technology develops it may be desirable to develop fuel injection maps specifically tailored for operation in the continuously variable displacement mode.

Therefore, it should be appreciated that the actual amount of fuel that is injected during each working cycle is generally not an absolute and fixed number (although that is possible and indeed desirable in some implementations). Rather, it is preferably an amount that is optimized for the current operational state of the engine. As suggested above, when we refer to an "optimized" amount of fuel—we don't necessarily mean that the amount is optimized for any particular variable (e.g., fuel efficiency, power, thermodynamic efficiency, environmental concerns). Rather, it may be an amount of fuel that is deemed appropriate for a particular operational state. The optimized quanta of fuel may be provided in a lookup table, calculated dynamically, or determined in any other suitable manner. When lookup tables are provided, the actual quanta of fuel delivered may be adjusted relative to the value provided by the lookup table based on emissions or other feedback received by the ECU.

Fuel Rich Drive Pulses

There may be times when it is desirable to provide a richer air/fuel mixture to the working chambers than the normal/full drive pulses in order to provided a desired emissions profile (e.g., to better match the emissions output of the engine to the catalytic converter) or for some other purpose. In effect, this requests delivering more fuel to the cylinder than the amount of fuel that is deemed optimal and more than a stoichiometric amount of fuel. By way of background, in many implementations, the "optimized" amount of fuel that is used for a particular operational state will correspond to a slightly lean mixture. That is, a slightly less than stoichiometric amount of fuel is introduced into each fired working chamber. An issue that can sometimes arise when running an engine lean is that the emissions profile of the cylinders may not always fall within the capacity of the catalytic converter. Similar types of problems occur in the operation of engines in a conventional mode. In order to address this issue, some conventional engines are periodically run in a fuel rich mode (i.e., a slightly greater than stoichiometric amount of fuel is provided) for a brief period in order to adjust the emissions profile in a manner that facilitates good operation of the catalytic converter.

Figure 10:
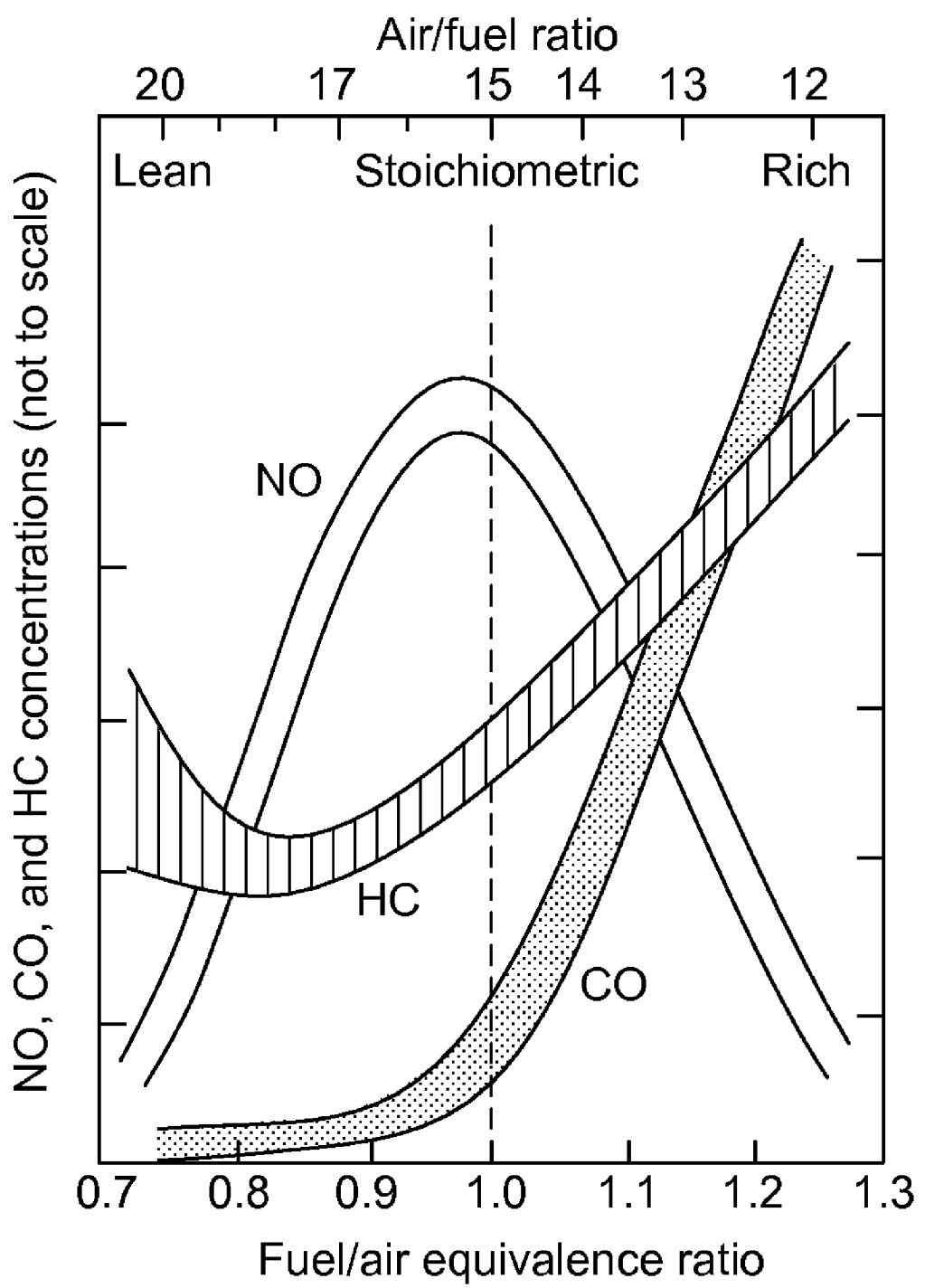
FIG. 10 is a graph illustrating the concentration of certain pollutants as a function of air/fuel mixture in a conventional spark-ignition engine.

The nature of the issue can be understood with reference to FIG. 10, which illustrates selected emissions characteristics of a representative Otto cycle engine at different air/fuel ratios. As can be seen therein, the amount of carbon monoxide (CO) in the emissions tends to increase as the mixture becomes richer and increases quite significantly in mixtures that are richer than stoichiometric. The amount of Nitric Oxide (NO) tends to be highest at a near stoichiometric mixture ratio and fall off relatively quickly as the air/fuel ratio becomes leaner or richer. The amount of hydrocarbons in the exhaust also generally tends to increase relatively quickly with increases in the mixture ratio beyond stoichiometric conditions. Many catalytic converters require the presence of a certain amount of carbon monoxide to run efficiently. If the engine runs lean, it is possible that the catalytic converter will become depleted and won't work efficiently due to the lack of carbon monoxide. In order to address these problems, some existing ECUs are designed to periodically run the engine with a rich fuel mixture for a short period of time in order to replenish the catalytic converter.

The catalytic converter depletion issue can readily be addressed in the described skip fire variable displacement mode by periodically utilizing fuel rich firings. If desired, the drive pulse generator can be configured to sometimes output "fuel rich" drive pulses that request the delivery of more than an optimal amount of fuel or the sequencer may be arranged to sometimes provide excess amounts of fuel to selected cylinders as appropriate. Alternatively, the sequencer or other logic within the fuel processor or engine control unit may be arranged to direct the fuel injection drivers to increase the amount of fuel delivered in a particular firing, or set of firings in order to obtain the desired effect.

In implementations that utilize the sigma-delta controller 202 at least in part to determine the timing of fuel rich pulses, one of the states of a multi-bit comparator such as described below with reference to FIG. 8 may be used to designate the fuel rich pulses. Although the sigma-delta controller 202 can be used to designate the timing of the fuel rich pulses, that is not necessary. Rather, the timing and generation of the fuel rich firings may be determined by a variety of components in response to signals received from exhaust gas monitoring sensors and/or the ECU. By way of example, in various implementations, the decision to introduce a fuel rich pulse or a set of fuel rich pulses may be made independently by the synchronizer 122, the sequencer 108, the ECU, other logic within the fuel processor in order to obtain the desired effect. It is noted that a fuel rich firings typically will not significantly affect the power generated by the firing. That is, the amount of energy derived from a fuel rich firing will typically relatively closely approximate the energy derived from a normal/optimized firing. Therefore, from a control standpoint, there is typically no need to alter the feedback to the sigma delta control circuit based on the additional fuel being delivered during fuel rich firings. However, if desired, the feedback can be estimated in another way or adjusted to reflect the actual energy output of the firing.

Partial (Lean) Drive Pulses

In the embodiments discussed above—all of the cylinders that are actually fired are operated at near their optimal efficiency, i.e., with constant or near constant fuel supply with substantially unthrottled operating conditions (e.g. at "full throttle" in throttled engines). However, that is not a requirement. In some circumstances it may be desirable to operate some of the working cycles at less than their optimal efficiency to meet specific short term needs such as more precisely controlling and/or smoothing the engine's output or to address emissions concerns. The described drive pulse generator 104 can readily be configured to cause some percentage (or all) of the non-skipped working cycles to operate at less than their optimal efficiency when that is desired. More specifically, the drive pulse generator may be configured such that some of the generated drive pulses are partial drive pulses that call for reduced energy output cylinder firings. The partial drive pulses may all have the same energy output level (e.g., ½ energy) or may have multiple discrete energy output levels (e.g., ½ and ¼ energies). Of course, the number of different energy output levels that are used in any particular implementation, as well as their relative magnitude, may be widely varied.

When a partial drive pulse is received by the sequencer 108, it arranges for a lower amount of fuel to be injected into the cylinder that is fired corresponding to the partial drive pulse. In engines that have a throttle, no effort would typically be made to adjust the throttle for partial drive pulses so that the amount of air delivered to a cylinder will be unaffected by a partial drive pulse. The amount of fuel that is delivered to the cylinder is preferably measured to supply the proportional amount of drive energy that is reflected in the partial drive pulse. For example, if the partial drive pulse calls for one half the total energy, then the amount of fuel that is supplied would be the amount of fuel expected to deliver one half the total drive energy—which would typically be more than ½ of the fuel required to operate at optimal efficiency, because the thermodynamic efficiency of the cylinder will be lower when it is operated under sub-optimal conditions.

It should be appreciated that although it is preferable to relatively accurately correlate the net energy delivered by the partial energy working cycles with the engine output requested by the partial drive pulses—that is not always required. Particularly when the partial drive pulses are a relatively low percentage of the total number of drive pulses (e.g., less than about 10 or 15 percent), their cumulative impact on the total drive energy delivered by the engine is not particularly large so approximations may still work adequately. For example, a one half drive pulse could be correlated to the delivery of one half (or other fixed percentage—e.g. 65%) of the fuel delivered in a full drive pulse.

It should be appreciated that the response time of most throttles is relatively slow. Therefore, in throttled engines, the throttle position will typically not change between the full drive pulses and the partial drive pulses in most situations. Rather, only the amount of fuel delivered to the cylinder will be changed (i.e., a smaller amount of fuel will be delivered for the partial drive pulses).

Partial drive pulses can be useful in a number of ways. As suggested above, they can be used to help smooth the engine's output. This smoothing can be useful at any engine speed and is especially noticeable at lower engine speeds (low RPMs). Another reason that partial drive pulses are sometimes desirable is to help further reduce engine vibrations. As pointed out above, many controllers such as the sigma-delta control circuit 202 described above are susceptible to generating tones—which in some conditions can lead to resonant vibration or other undesirable vibration patterns. Dither can be introduced to the controller and the sequencer can be designed appropriately to help break up some of these patterns. However, in many applications it may be desirable to provide other mechanisms to help break up patterns and/or more actively control engine vibrations. Partial drive pulses may be used in addition to and/or in place of other pattern control measures discussed herein.

Yet another reason to provide partial drive pulses is to change the emissions profile of the engine. For example, in some operational conditions in some vehicles, the catalytic converter may not be well suited to handle the emissions profile of only optimized full drive pulses. In such situations, the amount of fuel delivered to some of the fired cylinders may be varied to better match the emissions output of the engine to the catalytic converter.

The simple synchronizer 122 described above can readily be configured to handle partial drive pulses. In one implementation, the synchronizer is configured to generate a half energy pulse any time the burst length of high outputs from the sigma-delta control circuit is within a designated range. For example, if the burst length of high outputs is more than half the period of the drive pulse but less than a full drive pulse period, then a half pulse can be generated. Of course, the actual trigger points can be varied to meet the needs of a particular application (e.g., burst lengths from 45 to 90 percent of the drive pulse period or other suitable ranges may be set to trigger the generation of a partial drive pulse).

If multiple partial drive pulse levels are provided, then each level can be configured to trigger on burst lengths having an associated range. For example, burst lengths of 25-49% of a drive pulse period may cause the generation of a quarter drive pulse, and burst lengths of 50-99% of the drive pulse period may cause the generation of a half drive pulse. Again, it should be appreciated that this is merely an example and that the actual ranges and conditions that trigger the partial drive pulses may be widely varied.

When desirable, partial drive pulses can also be used when the burst lengths are significantly longer than the drive pulse period, but not long enough to trigger another full drive pulse. For example, a partial drive pulse may be triggered when the remainder of a burst (i.e., the length of the burst that exceed an integer number of drive pulses) falls within a designated range.

In order to insure that the engine operates efficiently and within acceptable emission levels, in many applications it may be desirable to limit the number of partial drive pulses outputted by the drive pulse generator 104. For example, it may be desirable to limit partial drive pulses to some percentage (e.g., a maximum of 10 or 20 percent) of the drive pulses generated by the drive pulse generator. If desired, the percentage of drive pulses permitted may also be a function of engine speed. For example, if the engine is running very slowly (e.g., idling) it may be desirable to permit more (or all) of the drive pulses to be partial drive pulses.

The drive pulse generator may readily be configured to provide partial drive pulses and to set appropriate conditions or limitations regarding the availability, number and/or timing of the partial drive pulses. By way of example, a sigma delta controller and corresponding drive pulse generator suitable for generating multiple level drive pulses is discussed below with reference to FIG. 8.

In still other embodiments of throttled engines, the engine can sometimes be operated in a skip fire type variable displacement mode with a fixed throttle position that is less than wide open (i.e., at partial throttle). In this embodiment, the amount of fuel delivered to each cylinder/working chamber may be optimized for the amount of air actually delivered to the cylinder. This partial throttle skip fire operation can be useful in a variety of applications—including application where relatively low power outputs are required and/or at low engine speeds, as for example, when the engine is idling, the vehicle is breaking, etc. Although the fuel efficiency at partial throttle will generally not be as good as it would be at full throttle, the partial throttle skip fire operating mode will generally still provide better fuel efficiency at a given engine speed/power output than conventional operation of the engine.

The partial throttle operational mode may be desirable in a variety of different applications. For example, partial throttle operation may be used to: (a) facilitate smoother engine control and/or operation at low engine speeds; (b) provide better engine braking; (c) improve emissions, etc.

Variable Displacement Operating Mode

There are times during the operation of an engine where it might not be desirable to operate the engine in the described continuously variable displacement operating mode. At such times, the engine can be operated in the same way it would be operated today—i.e., in a normal or conventional operating mode—or in any other manner that is deemed appropriate. For example, when an engine is cold started it may not be desirable to immediately operate any of the cylinders at their optimal efficiency. Another example is when the engine is idling and/or the engine speed is low and the load on the engine is low. In such conditions it may be undesirable to operate the cylinders at their optimal efficiency because it may be difficult to insure smooth operation of the engine and/or control vibrations. For example, if a 4 cylinder engine is idling at 600 RPM with no significant external load (e.g., the vehicle is in neutral), a total of 1200 firing opportunities (i.e., 300 firing opportunities per cylinder) would occur each minute or 20 each second. However, in neutral, the load seen by the engine will primarily be the frictional losses associated with keeping the crankshaft turning. This load may be low enough such that more than a second would pass between sequential optimized firings. Such delays between firings could lead to rough operation and undesired vibrations in many engines. Similarly, when the driver is braking and in other situations where the load on the engine is very low, it may be undesirable to continue to fully optimize the working cycles.

To handle these types of situations, the engine can be run in a conventional mode any time that the optimized working cycles are undesirable. A wide variety of triggers can be used to determine when it is appropriate to shift between operational modes. For example, an engine control unit that incorporates the optimized control described herein can be arranged to operate in a conventional mode for a fixed period after every start—or until the engine reaches a desired operating temperature. Similarly, the engine control unit may be arranged to operate in a conventional mode any time the engine is operating at speeds outside a prescribed range—e.g., the engine is idling or otherwise operating at less than a threshold engine speed (e.g. 2000 RPM). Although the concern is greatest when the engine is operating at low engine speeds, if desired or appropriate, the optimized control of the variable displacement mode can also be disengaged at engine speeds above a designated threshold as well (e.g., at above 6000 RPM). This might be desirable to provide additional power at high engine speeds or when maximum engine output is desired. In another example, the engine could be operated in the variable displacement mode only when the engine is running within a specific range of engine speeds (e.g., 2000-4000 RPM). In other examples, the trigger thresholds for entering and exiting the variable displacement mode may be different. For example, it may be desirable to provide a first threshold (e.g. operating at over 2500 RPM) to trigger entering into the variable displacement mode and to provide a second threshold (e.g. operating at less than 2000 RPM) for exiting the variable displacement mode. The staggering of the thresholds helps reduce the probability of frequent transitions in and out of different operating modes.

In other examples, the variable displacement mode can be disengaged: (a) when the vehicle is braking; (b) if undesired vibrations or other perceived problems are detected in the engine; (c) when the load on the engine is below a designated threshold; and/or (d) when the accelerator pedal position is below or above a designated threshold. In still further examples, the variable displacement mode can be disengaged when there are time delays between sequential firings of greater than a designated period of time (e.g., 0.2 seconds) or gaps between sequential firings of more than a designated number of firing opportunities. In still other embodiments, it may be desirable to provide some hysteresis or delay in transitions between modes. For example, if a threshold is set for the engine to transition from the variable displacement mode to a conventional operational mode if the engine speed falls below 2000 RPM, it might also be desirable to require that the engine operate at less than 2000 RPM for some period (e.g., at least 3 seconds) before the mode transmission is made. Such a waiting period helps reduce the probability that very transitory events, such as shifting gears, would trigger a mode change.

It should be appreciated that these are just examples of situations where it may be desirable to opt out of the continuously variable displacement mode and that there may be a wide variety of other situations that might warrant disengagement and/or triggers that may be used to initiate disengagement. The described situations and triggers are simply examples which can be used individually, in any desired combination, or not at all. Various embodiments of engine control units, firing control units, fuel co-processors and other arrangements that incorporate the described optimizations can be arranged to disengage the continuously variable displacement mode whenever deemed appropriate and/or whenever operation in the continuously variable displacement mode is deemed inappropriate.

In still other embodiments the firing control unit may be arranged to still skip working cycles in certain situations, but to also direct the delivery of smaller than optimal amounts of fuel to the working chambers that are fired. In these embodiments the engine remains in a continuously variable displacement mode even though it is not optimizing the working cycles. This type of approach may be particularly appropriate during braking and/or in situations where the engine speed is below a speed that guarantees smooth operation. It should be appreciated that an engine operating using this type of deoptimized working cycles would still typically have better thermodynamic efficiency than an engine operating in a conventional mode because the active working cycles are more efficient than the working cycles would be if every cylinder was being fired. This type of control may readily be implemented in controllers that are arranged to output partial drive pulses of the type described above. Alternatively, the controller (such as any of the sigma-delta controllers described above) could simply be tuned down to output proportionally smaller energy drive pulses in their drive pulse generator. Even if deoptimized control is contemplated, there may be times (such as during startup) when it is preferable to run the engine in a conventional operating mode.

Feedback Control

In the discussions herein, we often refer to controlling the engine to provide a desired output. In a simple analog approach contemplated in the embodiments described above, feedback indicative of a firing or drive pulse may be provided at a generally constant level for a period of time corresponding to the period between firing opportunities. It should be appreciated that when this type of feedback is provided, the engine is controlled to provide a desired output that is a function of accelerator pedal position (or other input signal) and the pedal position does not correspond to a fixed torque or power value. Thus, the actual power delivered by engine at any desired output level will be a function of the current operational state of the engine and the current environmental conditions just as it is in most current vehicle control systems.

Although constant level feedback for the period between firing opportunities it believed to work well for automotive type applications, it should be appreciated that the controller can readily be set up to provide different control behavior if desired. For example, if desired, the control could be set up to treat the desired output signal as a request for a designated amount of power output from the engine. In one such embodiment, each firing of a cylinder can simplistically be thought of as providing a specified amount of work, and the feedback can be based on this notion. That is, each fed back firing opportunity delivers the same quanta of negative feedback to the sigma delta controller.

It should be appreciated that in real engines, the amount of work, power and/or torque that is actually obtained from the firing of a particular cylinder will not always be the same. For example, it is well understood that engines have non-linear horsepower and torque curves that are heavily influenced by engine speed so the amount of useful work, power or torque that is obtained from an additional cylinder firing at one engine speed may differ from the amount of useful work, power or torque that is obtained from the firing at a different engine speed. Similarly, when different air/fuel ratios and/or different amounts of air or fuel are introduced to a working chamber, the actual amount of usable thermodynamic energy available from a particular firing will vary.

If desired, the feedback can be adjusted to more accurately reflect the actual amount of work (or torque or power) expected from the firing. By way of example, this can readily be done by an engine control unit that calculates the amount of useful work that is expected from the current firing and adjusting the feedback to the control circuit appropriately. Alternatively, the amount of work derived from each firing may be estimated based on a limited number of variables (e.g., only the amount of fuel provided, only the quanta of fuel provided and the engine speed, etc.). Of course, other approaches to estimating the output can be used as well. These estimates can be calculated dynamically during operation, provided in lookup tables accessible by the controller or determined using a variety of other approaches.

Although such fine tuning of the feedback is possible and may be desirable in some applications, it is believed that it is not necessary in most application. In practice any of these feedback approaches can be made to work adequately. The choice of the feedback approach used will have an effect on the engine's performance and efficiency and the selection of a particular feedback approach may be based on the desired performance characteristics for the engine.

If the engine begins to operate in a range where the power or torque outputted by the engine begins to level or drop off, the drive pulse generator can be designed to recognize the operational state and respond appropriately. In some embodiments, this may be accomplished by simply disengaging the continuously variable displacement mode and operating using conventional control. In some other embodiments, the drive pulse generator may be adapted to adjust the outputted drive pulses accordingly. Of course, a wide variety of other approaches can be used to handle these situations as well.

In most of the embodiments described above it is contemplated that the feedback from the driven system (e.g., the drive pulse pattern 110 outputted by the synchronizer 122; and/or the actual firing pattern 120) be based on an explicit feedback signal. However, it should be appreciated that in some embodiments the required information can be derived from other signals that might be available to the controller. For example, each actual firing of a working chamber will have some effect on the engine speed (i.e., it will increase the engine speed). The change may be quite small in terms of its impact on the driven mechanical system—but such changes may be readily detectable using modern electronic signal processing techniques. Therefore, if desired and the tachometer signal is accurate enough, the actual firing pattern feedback can be derived from a tachometer (engine speed) signal if desired. In general, the feedback may be derived from any signal source that is available to the controller that would have information indicative of the firing pattern embedded therein.

Retrofitting Current Engines

In current commercially available variable displacement engines, selected cylinders are shut down—often in banks of two at a time and the remaining cylinders are used in their normal operating mode. Since fewer cylinders are working when some of the cylinders are shut down, the remaining cylinders operate under conditions that are more efficient than they would be if all of the cylinders were operating. However, they still don't operate at their optimal efficiency.

When selected cylinders of a conventional variable displacement engine are shut down, the values associated with those cylinders are typically closed and kept closed through the operation of the engine. In engines that don't have electronic valves, this requires a more complex mechanical structure and some coordinated efforts to selectively disengage the valves from the cam shaft. As a result, commercially available variable displacement engines are not designed to rapidly move back and forth between different displacements.

One reason that the valves are kept closed in cylinders that are shut down in conventional commercially available variable displacement engines is to help reduce pumping losses that would inherently occur in the shut down cylinders if the valves of the skipped cylinders open and close at their normal times. The same type of pumping losses would occur if the valves are opened and closed at their normal times when operating in the described continuously variable displacement mode. Therefore, when used in engines that have selective control over the opening and closing of the valves, it may be desirable to close the intake and exhaust valves of cylinders that are skipped. However, the fuel and thermodynamic efficiency of the engine will be substantially improved even if the valves of skipped cylinders are opened and closed at their normal times.

The perceived need to close the valves associated with shut down cylinders may have led to the impression that it is impractical to convert existing fixed displacement internal combustion engines to variable displacement engines. One very significant advantage of the present invention is that an appropriate controller can readily be installed on many existing engines to retrofit those existing engines to significantly improve their fuel efficiency. This is true even if it is not possible or practical to close the valves of skipped cylinders—which will be the case in a significant majority of the existing engines. Retrofitting can be done by replacing the engine control unit (also often referred to as an engine control module) with an improved engine control unit that incorporates the control of the present invention; by interfacing a fuel co-processor or a co-processing unit that incorporates the control of the present invention with the existing engine control unit; or by otherwise incorporating the described control into an existing engine control unit.

Another reason that the valves associated with shut down cylinders are held in the closed position in conventional variable displacement engines is to insure that the emission control unit doesn't try to change operation of the engine due to the very large amount of oxygen that would be present in the exhaust gas stream if the valves associated with unfueled, skipped cylinders opened and closed normally. Specifically, if air is sucked into a cylinder and not burned before it is expelled from the cylinder, the expelled gas will have dramatically more oxygen in it than would be present if fuel had been injected into the cylinder and burned (which would have the effect of consuming much of the oxygen present). Many engines have exhaust gas oxygen sensors to detect the amount of oxygen present in the exhaust gas stream. The oxygen sensors provide information to the emission control units, which utilize the information to help manage engine operations to insure that exhaust gas emissions are minimized and conform with environmental regulations. If the valves of skipped cylinders are allowed to open and close in a conventional manner while operating in the continuously variable displacement mode, then the exhaust gases will have far more oxygen than the emissions control unit expects. Accordingly, when engines that have exhaust gas oxygen sensors are run in a manner that allows the valves of skipped cylinders to open and close in a normal fashion, it will typically be desirable to adjust or override the oxygen sensor signal, or to adjust any control that is based on the level of oxygen in the exhaust gas to account for the extra oxygen that is expected in the exhaust. In other applications, it may be desirable or necessary to replace the oxygen sensor with a wideband lambda sensor that works with the engine control unit or fuel co-processor. Additionally, as previously mentioned, it may sometimes be desirable optimize the amount of fuel provided with each firing and/or to periodically provide partial or fuel rich fuel charges to insure that the exhaust emissions are suitable for good operation of the catalytic converter.

Another factor that may be desirable to consider when retrofitting current engines is trying to ensure that the "feel" of operating the engine (e.g. driving the vehicle that includes the controlled engine) does not change too appreciably after the retrofit is made. That is, it might be desirable for the feel of the engine to be similar before and after a retrofit is made. One way to help accomplish this is to transition the engine from the continuously variable displacement mode to a "normal" operating mode that modulates the throttle and does not skip cylinders anytime it is perceived that the feel of operating the engine might change. In other implementations, the control in the variable displacement mode may be altered in specific situations to provide a feel that is closer to the feel that would be experienced during normal operations.

By way of example, many vehicles (including trucks, cars, etc.) experience noticeable "engine braking" when the accelerator pedal is released. In the continuously variable displacement mode, the throttle is typically held wide open to allow maximum air to be supplied to the working chambers and thereby facilitate optimizing the thermodynamic efficiency of the engine. However, when the throttle is wide open, the pumping losses experienced by the engine are reduced and accordingly, the amount of engine braking that would be felt by a user may be reduced by a noticeable amount. In some situations, it may be desirable to try to more closely mimic the engine braking feel that would be perceived during pre-retrofit operations. Again, this can be accomplished by transitioning the engine from the continuously variable operating mode to a normal operating mode any time the accelerator pedal is released or the brakes are applied. Alternatively, the throttle could be partially or fully closed (e.g., closed to the extent it would be closed during normal operations), while still skipping selected firings in the continuously variable displacement mode. If such an approach were used to facilitate engine braking, the amount of fuel introduced into the fired working chambers would be adjusted to correspond to the reduced amount of air that would be provided to the cylinders due to the closing, or partial closing of the throttle.

Although the concept of engine braking is being discussed in connection with a discussion of retrofitting existing engines, it should be appreciated that the design goals for a particular engine may require more effective engine braking than would be provided with a fully open throttle even in new engines. Accordingly, the firing control unit 100 may be arranged to adjust the throttle position to provide desired engine braking as desired. Alternatively or additionally, in engines that facilitate selective control of the opening and closing of the valves (e.g. engines that have electronic valves) it may be possible to modulate the opening and/or closing of the valves of skipped cylinders to provide enhanced engine braking.

It should be appreciated that engine braking is just one facet of an engine's "normal" feel that may be desirable to replicate during operation in a variable displacement mode. The firing control unit 100 may be designed to replicate other desired aspects of an engine's operational feel as well.

Fuel Control Processor

The described control can be implemented in a wide variety of different manners. It can be accomplished using digital logic, analog logic, algorithmically or in any other appropriate manner. In some embodiments the continuously variable control logic will be build into the engine control unit (ECU—sometimes also referred to as an ECM—engine control module). In other embodiments, the continuously variable displacement mode control logic can be built into a fuel co-processor or a co-processing unit that is arranged to work in conjunction with an existing engine control unit.

It is anticipated that as the technology develops, the continuously variable displacement mode control logic will be integrated into the engine control units that are provided with new vehicles or engines. This is particularly beneficial because it allows the ECU to readily take advantage of all of the features of the engine that are available to improve engine performance using the continuously variable displacement mode.

New ECUs that incorporate the continuously variable displacement mode can also be developed for vehicles that are on the road today (and for other existing engines and/or engine designs). When such ECUs are developed the existing engines can readily be retrofitted by simply replacing the existing ECU with an improved ECU that incorporates the variable displacement mode.

Alternatively, as will be appreciated by those familiar with current automotive engine control design—the engine control units in most late model automobiles are arranged such that third party devices can interface with the engine control unit. These interfaces are often provided, at least in part, to facilitate engine diagnostics—however, a variety of third parties products such as turbochargers, superchargers, etc. include control co-processors that have been designed to utilize such interfaces to work with the engines without voiding the manufacturer's warranty. These interfaces can be used advantageously to allow a low cost fuel co-processor that incorporates the continuously variable control logic to be installed as a retrofit to greatly improve the fuel efficiency of cars on the road today.

Fuel Co-Processor

Figure 6:
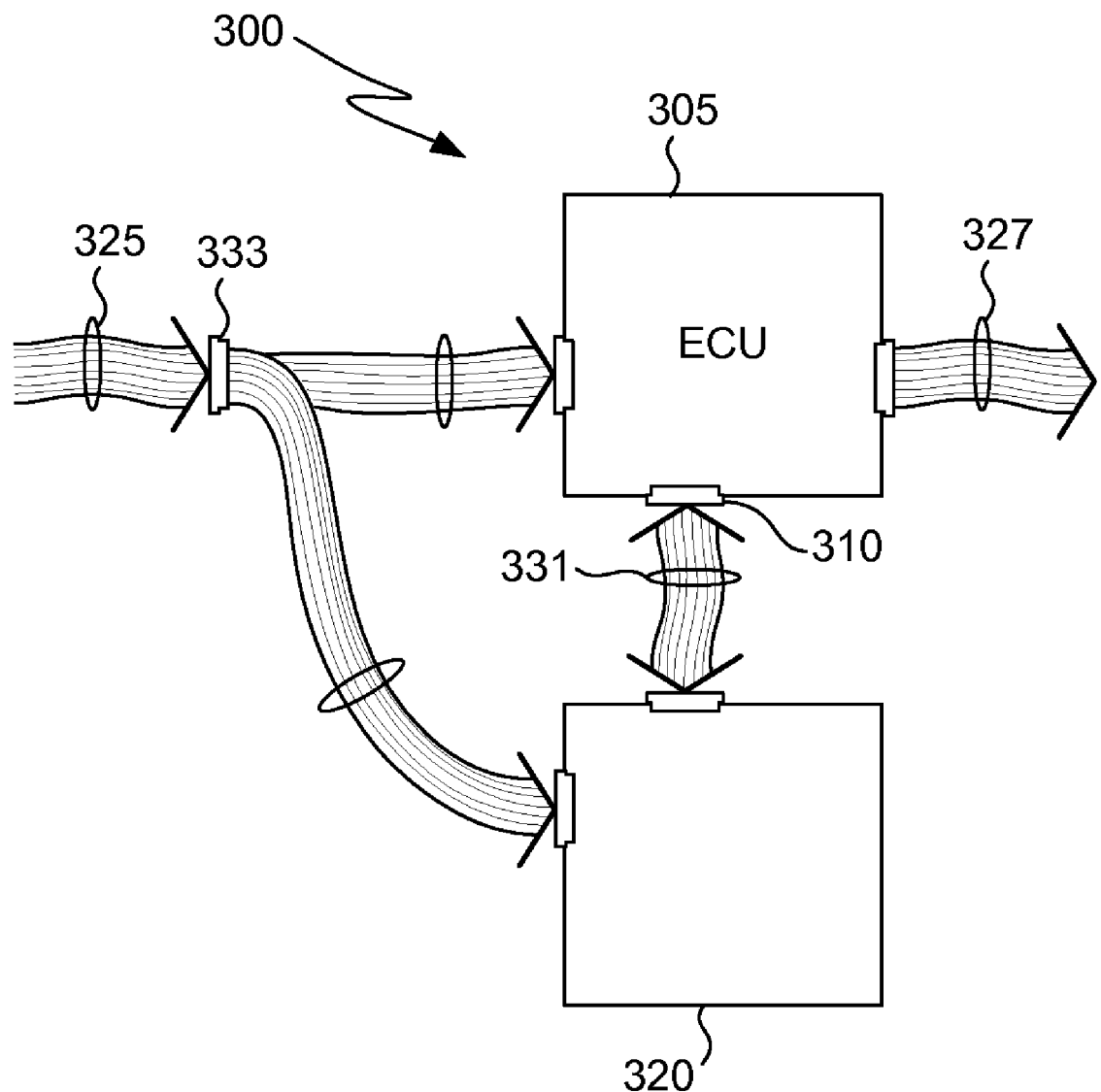
FIG. 6 is a block diagram of an engine control architecture that includes a fuel co-processor in accordance with one embodiment of the present invention.

Referring next to FIG. 6 an engine control architecture that includes a fuel co-processor in accordance with one embodiment of the present invention will be described. The engine control system 300 includes a conventional engine control unit (ECU) 305 and a fuel co-processor 320 that incorporates continuously variable displacement mode control logic such as the logic illustrated in FIG. 2. This design is particularly well adapted for retrofitting existing engines to incorporate the described continuously variable displacement operating mode.

As will be appreciated by those familiar with the art, the designs of the existing ECUs and their respective interfaces vary significantly and accordingly, the fuel co-processor must be adapted and designed to work with the particular ECU provided for the engine. Conceptually, the ECU typically includes an input cable 325 having a plurality of input lines that deliver the signals and sensor inputs required by the ECU and an output cable 327 that includes a plurality of output lines that deliver the control and other outputs provided by the ECU to other devices. In practice, the input and output cables may be integrated into a single cable bundle or multiple bundles that mix input and output lines, and/or may include some duplexed I/O lines.

Most late model automotive engine control units (ECUs) have external interfaces that permit third party devices to interact with the ECU. Often, this interface takes the form of a diagnostic interface. The ECU 300 in the embodiment illustrated in FIG. 6 includes an external diagnostics interface 310 and the fuel co-processor 320 communicates with the ECU through the diagnostic interface. Specifically, an ECU bus cable 331 connects the fuel co-processor 320 to the diagnostic interface 310. The input cable 325 is connected to a splitter 333 that delivers the input signals to both the ECU 305 and the fuel co-processor 320. Therefore, the co-processor has all of the information available to it that is available to the ECU. When operating in the continuously variable displacement mode, the fuel co-processor communicates with the ECU over the ECU bus cable 331 and overrides the throttle and fuel injection level instructions calculated by the ECU and instead orders the firings and throttle positions determined to be appropriate by the fuel co-processor. The co-processor also overrides other inputs (such as the oxygen sensor input) as appropriate to insure that the rest of the engine's systems run correctly.

Figure 11:
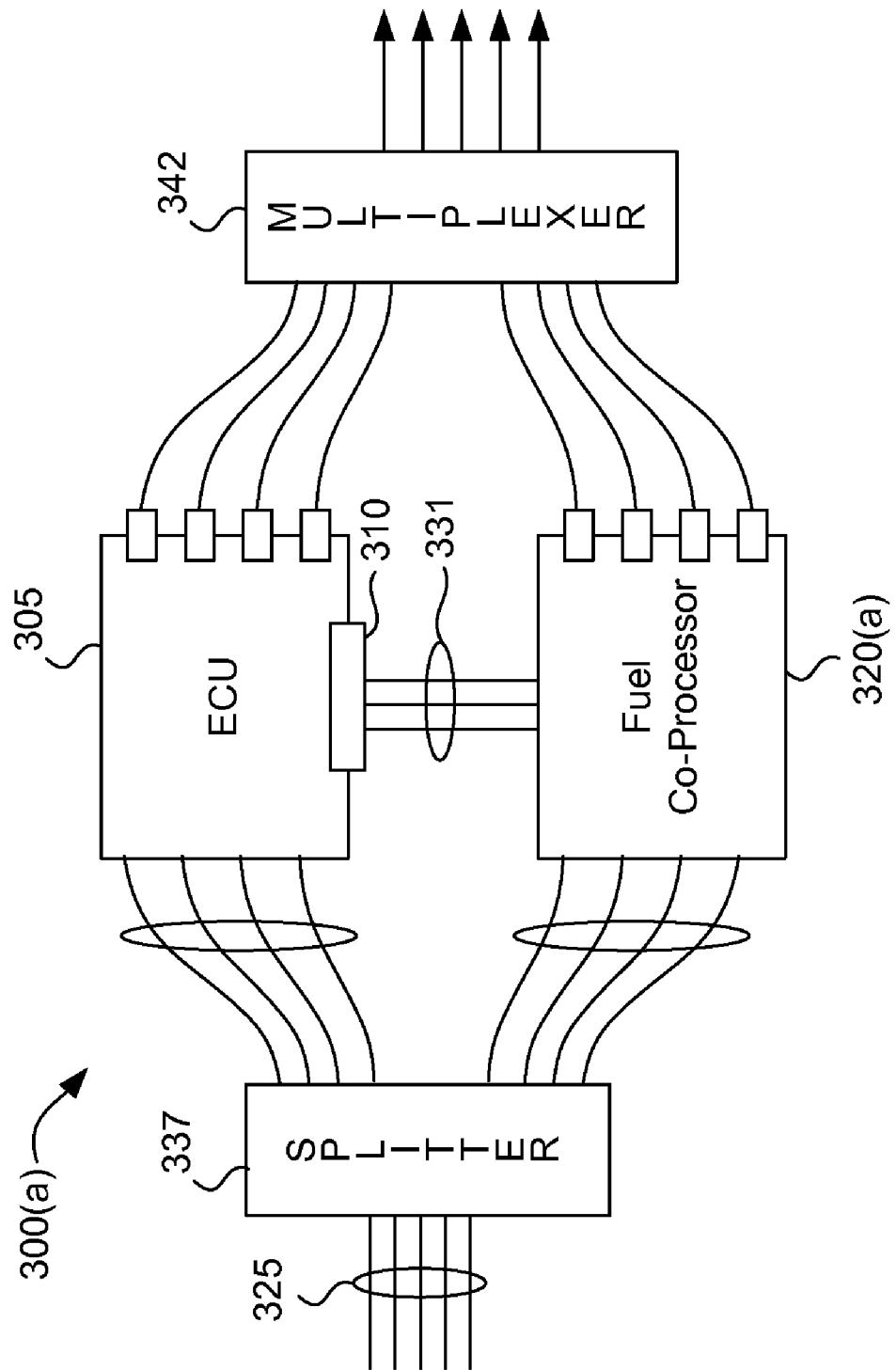
FIG. 11 is a block diagram of an engine control architecture that includes a fuel co-processor in accordance with another embodiment of the present invention.

Another fuel co-processor embodiment is illustrated in FIG. 11. In the illustrated embodiment, the engine control system 300(*a*) includes a conventional engine control unit (ECU) 305, a fuel co-processor 320(*a*) that incorporates continuously variable displacement mode control logic and a multiplexor 342. In this embodiment, the fuel co-processor 320(*a*) (in addition to the ECU 305) includes drivers for each of the fuel injectors so that the fuel co-processor itself can drive the fuel injectors. In this arrangement, the ECU 305 and the fuel co-processor 320(*a*) operate in parallel, with each receiving inputs from the input cable 325 and both determining the appropriate engine control, which are fed to multiplexor 342. When the engine is operating in the continuously variable displacement mode, the multiplexor 342 is directed to only deliver the signals received from the fuel co-processor 320(*a*) to the fuel injectors (and any other components controlled by the fuel co-processor). Any time the engine is taken out of the variable displacement mode, the multiplexor 342 is directed to only deliver the signals received from the ECU to the fuel injectors (and other components). Any components that are controlled by the ECU in both the normal and variable displacement operating modes are always controlled directly by the ECU.

In the embodiment of FIG. 11, the fuel co-processor 320(*a*) communicates with the ECU over ECU bus cable 331 through the diagnostic interface 310 and is arranged to override any input signals (such as the oxygen sensor signal) that need to be corrected for when the engine operates in the variable displacement mode.

Although specific wirings of the fuel co-processor are illustrated in FIGS. 6 and 11, it should be appreciated that a wide variety of other wirings could be utilized. For example, the splitter 333 may be designed to only deliver some of the input signals to the fuel co-processor 320, since some of the input signals may not be relevant to the fuel co-processor's operation. Additionally or alternatively, input signals that are intended to be modified by the fuel co-processor may be wired to first be input to the co-processor and then a (potentially) modified signal may be fed from the fuel co-processor to the ECU. That is, the fuel co-processor may intercept some or all of the input signals and modify some of those signals as appropriate prior to their delivery to the ECU.

In still other embodiments some or all of the output lines may be connected to the fuel processor rather than the ECU. This is particularly appropriate in implementations in which the fuel co-processor is designed to determine the firing pattern in all operations of the engine.

Electronic Valves—and Operating on Half Cycles

In conventional 4-stroke reciprocating piston engines the working cycle of each piston can only begin after every second reciprocation of the piston (e.g., after 0, 2, 4, 6, 8 . . . reciprocations of the piston). In engines that utilize a conventional camshaft to open and close the valves, the same is true in the continuously variable displacement mode. That is, the intake valves can only be opened every other reciprocation of the crankshaft even when one or more working cycles are skipped. However, some more recent engine designs have incorporated electronic valves (i.e., valves that are opened and closed electronically rather than mechanically). In such engines it is possible to open the valves at any desired time. When an engine having electronic valves is operated in a variable displacement mode that skips working cycles of the engine, there is no inherent need to limit the initiation of working cycles to every other reciprocation of the engine.

That is, rather than restraining the controller to skipping integer numbers of working cycles (e.g., 1, 2, 3 ... working cycles) the controller may be arranged to skip half working cycles as well (e.g., ½, 1, 1½, 2, 2½, 3 ... working cycles). This can help both smooth and improve the precision and responsiveness of the engine. It can also be beneficial from a vibration control standpoint because the availability of starting on a half cycle can help break up patterns that can develop in the drive pulse signal. For example, if the simple sequential sequencer discussed above with respect to FIG. 4 is used to generate a firing pattern, the sequencer can readily be adapted to allow the "next" working cycle to begin at what would traditionally be considered a midpoint of a working cycle. In a 4-stroke piston engine this means that a working cycle can be initiated after any number of reciprocations of the piston— including after odd numbers of reciprocations of the piston. In contrast, the working cycles of traditional 4-stroke piston engines can only be initiated after an even number of reciprocations of the pistons. Of course the same principles apply to piston engines having longer (e.g., 6 stroke) working cycles.

The half cycle (or partial cycle) initiation of a working cycle approach can be used in any engine that provides control over the timing of the opening and closing of the valves. Engines with electronically controlled valves are the only commercially available engines that currently have such abilities. However, if other valve control technologies that utilize magnetic, electromagnetic, mechanical, or other suitable techniques for controlling the opening and closing of the valves are developed, they can readily be used as well.

When control over the timing of the opening and closing of the valves is provided, the valves may be held closed during skipped working cycles as they are in most current commercially available variable displacement engines. Alternatively, it may be desirable to open and close the valves in a different sequence than normal fired cylinders to help reduce pumping losses.

It should be appreciated that the ability to begin a working cycle during any reciprocation of the engine is believed to be very different than operations possible in current engine designs.

Sigma Delta Controller with Variable Clock

As discussed above, a variety of adaptive predictive controllers including a variety of different sigma delta controllers may be used in the drive pulse generator 104. As mentioned above, a variable clock can be used in the sigma delta control circuit 202. Using a variable clock that is based on engine speed for the comparator has the advantage of better synchronizing the output of the sigma delta control circuit with the engine's operation. This, in turn can help simplify the overall design of the synchronizer portion of the drive pulse generator.

Figure 7:
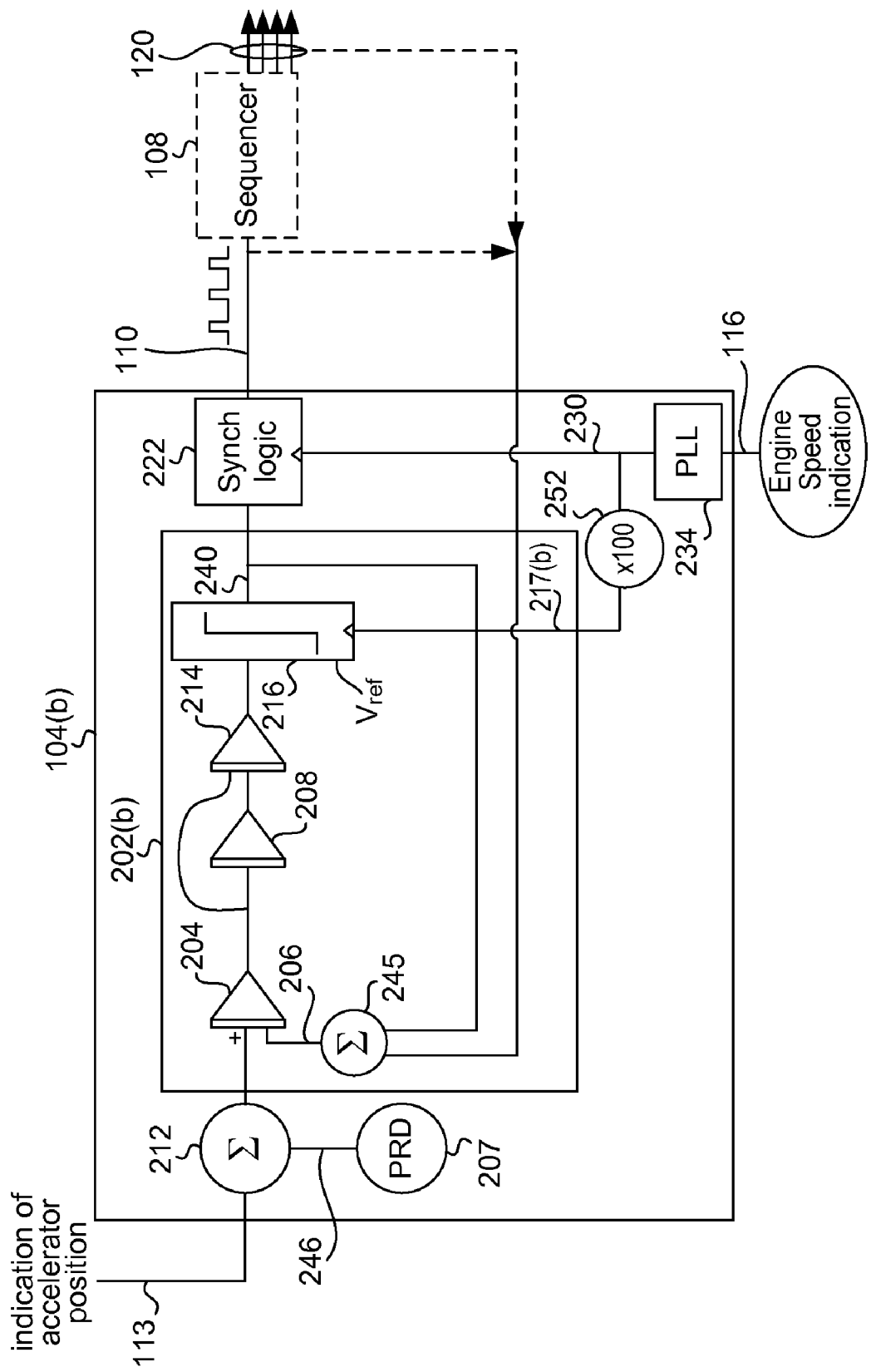
FIG. 7 is a block diagram of a sigma-delta control circuit embodiment having a variable clock based on engine speed.

Referring next to FIG. 7 an alternative embodiment of the drive pulse generator that incorporates a variable clock sigma delta controller 202(*b*) will be described. The drive pulse generator 104(*b*) has a structure very similar to the drive pulse generator 104(*a*) described above with reference to FIG. 3. However, in this embodiment, the clock signal 217(*b*) provided to the comparator 216 is a variable clock signal that is based on engine speed. The clock signal is generally synchronized with the engine speed by utilizing a phase lock loop 234 that is driven by an indication of engine speed (e.g., a tachometer signal). As described above—it is desirable for the sigma delta controller to have a sampling rate, and therefore an output signal 240(*b*) frequency that is substantially higher than the desired frequency of the drive pulse pattern outputted by the synchronizer 222. Again, the amount of oversampling can be widely varied. As indicated above, oversampling rates on the order of 100 times the desired drive pulse frequency work well and accordingly, in the illustrated embodiment a divider 252 is arranged to divide the clock signal 230 provided to the synchronizer logic by a factor of 100, and the output of the divider 252 is used as the clock for comparator 216. This arrangement causes the output of the comparator 216 to have a frequency of 100 times the frequency of the drive pulse pattern that is output by the synchronizer 222. Of course, in other embodiments, the divider can be arranged to divide the signal by any integer number that provides sufficient oversampling. In other respects, the other components of the sigma delta controller 202 may be the same as described above with respect to FIG. 3. Any of the designs of the synchronizer 222 and/or the sequencer 108 discussed above or a variety of other synchronizer and sequencer designs may also be used with variable clock sigma delta controller 202(*b*). One advantage of synchronizing the output of the sigma delta controller 202 with the engine speed is that it permits simpler synchronizer designs.

Sigma Delta Controller with Multi-bit Comparator Output

As discussed above, in some embodiments it might be desirable to utilize reduced energy cylinder firings. The reduced energy firings may be used for a variety of purposes including helping reduce the probability of undesirable vibrations being generated by the engine, to help fine tune the control, to facilitate operation during idling or at low engine speeds, etc. To facilitate the reduced energy firings, the drive pulse generator 104 may be arranged to produce some partial drive pulses in the drive pulse pattern to indicate when reduced energy firings are desired.

Figure 8:
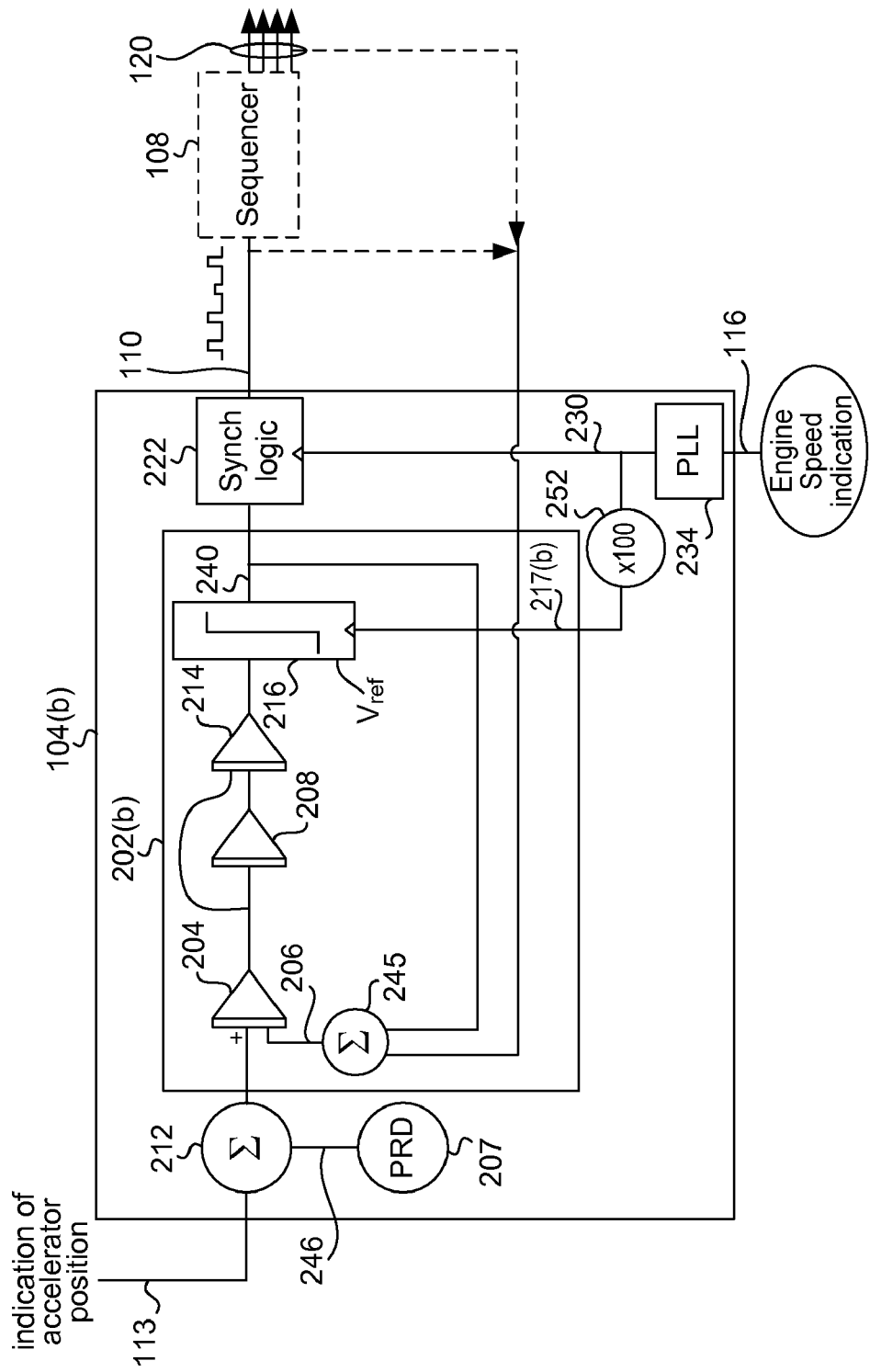
FIG. 8 is a block diagram of a sigma-delta control circuit embodiment having a multi-bit comparator.

Referring next to FIG. 8, a modification of the sigma delta controller that outputs a multi-bit signal will be described. In the illustrated embodiment, the multi-bit output of the sigma delta controller is used by the synchronizer 222 to generate partial drive pulses. In this embodiment, the sigma delta controller 202(*c*) may have a design similar to any of the previously described embodiments—however the comparator 216 (*c*) is arranged to output a multiple bit signal 240(*c*). In the primary described embodiment, the comparator 216(*c*) is two bit comparator and accordingly the output signal 240(*c*) is a two bit signal. However, in other embodiments higher bit comparators may be provided which would result in higher bit output signals 240(*c*). The actual number of bits used can be varied to meet the needs of any particular application.

The various states of the multi-bit output signal can each be set to have an associated meaning. For example, in a two bit comparator—a 0,0 output signal might reflect a zero output; a 1,1 output signal might be a full signal output—e.g. one; a 0,1 might be arranged to represent a ¼ signal; and a 1,0 might be arranged to represent a ½ signal. Of course a two-bit comparator may readily be designed to have the various states represent different levels than the 0, ¼, ½, and 1 levels suggested above. In higher order comparators, many more states would be available. For example, in a three-bit comparator, 8 states would be available; in a four-bit comparator 16 states would be available, etc.

As will be appreciated by those familiar with multi-bit comparator sigma delta design, the comparator 216(*c*) may be configured to output some (generally controllable) percentage of the non-zero samples as intermediate level signals. These intermediate signals can be treated by the synchronizer 222 and the sequencer 208 as corresponding to requests for partial energy drive pulses and reduced energy firings. For example, if the sigma delta controller 202(*c*) outputs a string of one half (½) level output signals that is sufficiently long to cause the synchronizer 222(*c*) to generate a drive pulse—the outputted drive pulse can be a half energy drive pulse. The half energy drive pulse, in turn, is used by the sequencer 108(c) to direct a half energy firing. The same type of logic can be used for other (e.g. quarter) level output signals. When the comparator output is a multi-bit output, the synchronizer and the sequencer can readily be arranged to handle and output corresponding multi-bit signals.

It should be appreciated that multi-bit comparator sigma delta controllers are typically arranged to generate extended strings of symbols having the same state. Therefore, any of the general sequencer logics described above can be used to output drive pulses having the same state as the signal 240(c) fed to the synchronizer 222(c). That is, the drive pulse outputted by the synchronizer may be arranged to match the level of the signal 240(c) input into the synchronizer that caused generation of the drive pulse.

Again, it should be appreciated that the logic of the synchronizer 222(c) can be optimized and/or widely varied to meet the needs of any particular application. In some applications it may be desirable to provide more sophisticated synchronizer logic to handle specific situations in a desired manner. For example, different logic may be provided to handle situations where the signal 240 inputted to the synchronizer transitions from a higher level to a lower non-zero level that is held through the end of a drive pulse period. In some implementations it may be desirable to have the drive pulse output at the lower level in such situations. Similarly, when the signal transitions from a lower non-zero level to a higher non-zero level, it may be desirable to provide specific logic to dictate what happens in such circumstances It should be appreciated that the thermodynamic (and fuel) efficiency of the engine will be best when the working chambers are operated at their optimal efficiency. Therefore, it is generally undesirable to have too many reduced energy firings unless there is a specific need for them. However, there are some situations where reduced energy firings may be desirable from a control standpoint. Generally, the number of reduced energy firings is preferably relatively low (e.g., less than 20% or more preferably less than 10%) when the engine is operating at moderate to higher engine speeds. The comparator 216(c) can readily be designed to output such percentages of intermediate signals in an effort to insure final number of reduced energy firings is within a desired range.

The comparator and/or synchronizer logic may also be arranged to take engine speed and/or the operational state of the engine (e.g. cold start, etc.) into account when determining the percentage of intermediate comparator output signals and/or partial drive pulses to output. For example, when the engine is idling or cold starting, it may be desirable to only output intermediate signals from the comparator so that only partial drive pulses are generated in those situations. It should be appreciated that the comparator and/or synchronizer logic may be arranged to accommodate a wide variety of different desired operational rules.

Differential Sigma Delta Controllers

In still other embodiments differential sigma delta controllers may be used. In such embodiments the synchronizer can be arranged to generate drive pulse patterns based on the differential signals outputted by the sigma delta controller. A wide variety of different differential sigma delta controllers may be used and generally they may include the variable clock and/or multi-bit comparator output features discussed above when desired. One advantage of differential sigma delta controllers is that they can often be configured to provide even smoother performance than a corresponding non-differential sigma delta controller.

In some circumstances it may be advantageous to operate in a mode that we refer to as an implied differential sigma delta. In such a mode, either the synchronizer or the sequencer (or both) are constrained to limit the drive pulses and/or chamber firings to one at a time. That is, in this mode, each fired working chamber is constrained to be followed by a skipped firing opportunity (and/or each drive pulse is constrained to be followed by null pulse). This implied differential sigma delta is particularly useful when the engine is operating at a level where significantly less than 50% of the firing opportunities are required to deliver the desired engine output since it can help further smooth the engine output by insuring that two firings do not immediately follow one another when the required output is relatively low.

It should be appreciated that automotive engines are often operated under conditions that require a relatively small fraction (e.g., 10-25%) of the power that the engine is capable of delivering. The implied differential sigma delta approach is particularly useful under these types of operating conditions. In some implementations it may be desirable to operate the engine in an implied sigma delta mode during some operational conditions, in a different type of continuously variable displacement mode during other operational conditions, and in a conventional operating mode during still other operational conditions. Of course, the number and nature of the various operational modes can be widely varied. Therefore, it should be appreciated that the engine controller may generally be arranged to operate in a variety of different operational modes during different operational conditions.

The constraints provided by implied sigma delta may also be widely varied. For example, when low engine outputs are required, there may be instances when it is desirable to constrain the firings pattern to skip at least two firing opportunities after each firing. In other instances it may be desirable to allow two firings to follow one another, but not three. In still other instances, it may be desirable to require a firing any time a designated number of skips follow one another. Generally, it should be appreciated that the firing pattern for a particular engine may be constrained by the sequencer or the synchronizers in a wide variety of manners that are determined to appropriate to provide the desired engine output and the constraints may be arranged to vary with the load placed on the engine, the overall ratio of firings to skips, or any other factor that is appropriate for the control of a particular engine.

Digital Sigma Delta Controllers

Figure 9:
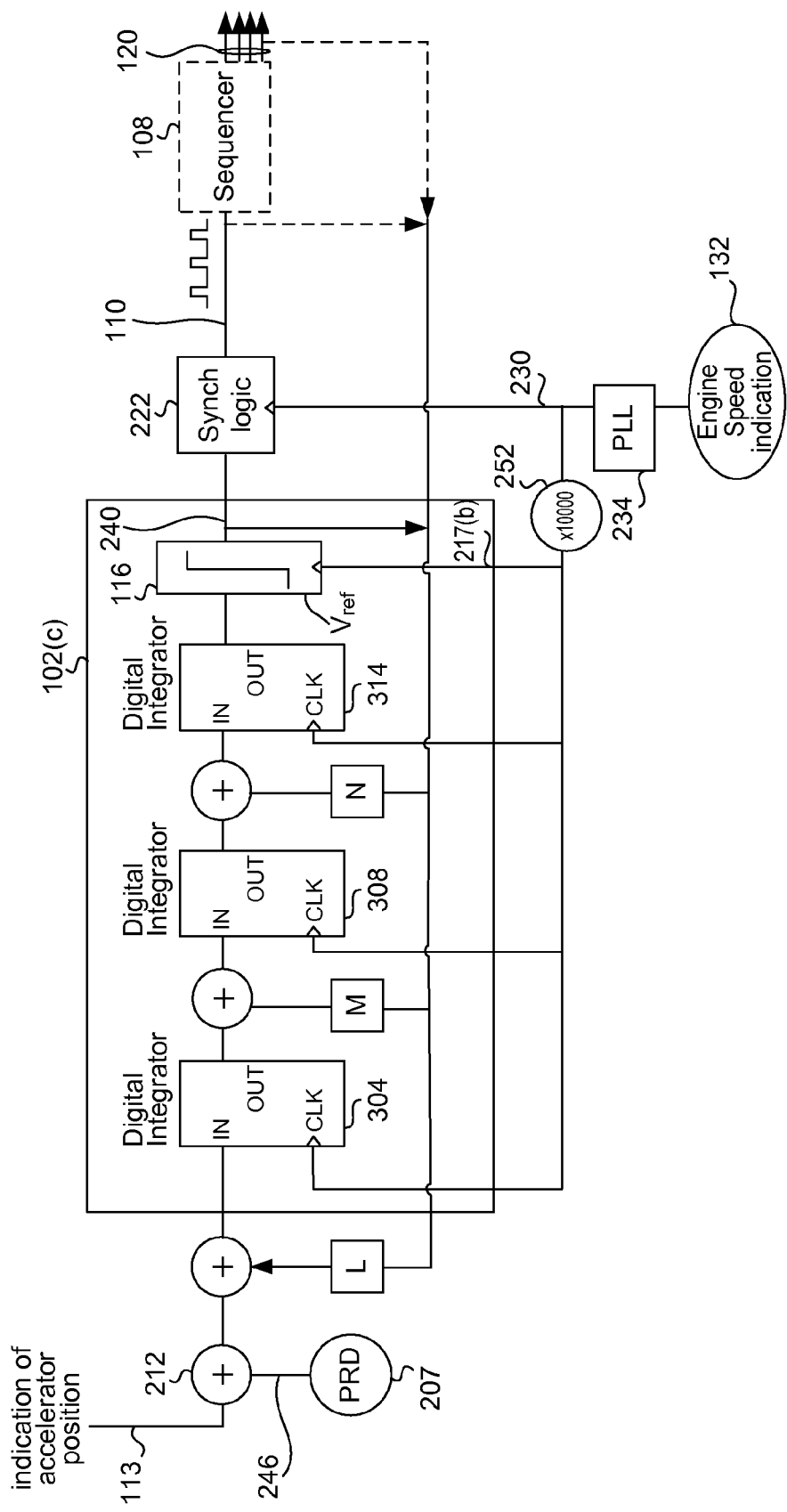
FIG. 9 is a block diagram of a digital sigma-delta control circuit embodiment in accordance with another embodiment of the invention.

As mentioned earlier digital sigma delta controllers may also be used. One such embodiment is illustrated in FIG. 9, which illustrates a digital third order sigma delta control circuit 202(c). In this embodiment, accelerator pedal position indicator signal is inputted to a first digital integrator 304. The output of the first digital integrator 304 is fed to a second digital integrator 308 and the output of the second digital integrator 312 is feed to a third digital integrator 314. The output of the third digital integrator 314 is fed to a comparator 116 that may be arranged to operate in the same manner as either the single bit or multi-bit comparators described above with respect to the analog sigma delta circuits. In the embodiment illustrated in FIG. 9, the first digital integrator 304 effectively functions as an anti-aliasing filter.

Negative feedback is provided to each of the three digital integrator stages 304, 308 and 314. The feedback may come from any one or any combination of the output of the comparator 116, the output of the synchronizer logic 122 or the output of the sequencer 126. Each stage feedback has a multiplication factor of L, M, and N respectively.

Like the analog sigma delta control circuit described above, the primary input to the digital sigma delta control circuit may be an indication of the accelerator position 113 or any other suitable proxy for desired output. As previously described, the desired output signal 113 is combined with pseudo random dither signal 246 in the illustrated embodiment in order to reduce the possibility of generating undesirable tones.

The primary difference between analog and digital operation is that the integrators in analog sigma delta are continuously active, whereas the digital integrators are only active at the beginning of each clock cycle. In order to insure that the digital integrators closely track the input signal it is desirable to run the clock at a very high speed. By way of example, clock rates on the order of 5 MHz or more would work well for most applications. The clock may be either a fixed rate clock or a variable clock that is based on an indication of engine speed.

In other implementations, it may be desirable to provide hybrid analog/digital sigma delta controllers. In a hybrid analog/digital controller, some of the stages of the sigma delta controller may be formed from analog components, while others may be formed from digital components. One example of a hybrid analog/digital sigma delta controller utilizes an analog integrator 204 as the first stage of the controller, in place of the first digital integrator 304. The second and third integrators are then formed from digital components. Of course, in other embodiments, different numbers of stages may be used and the relative number of analog vs. digital integrators may be varied.

In still other embodiments, digital or hybrid differential sigma delta controllers may be used.

Pre-Processor Stage

In some of the embodiments described above, a signal from the accelerator pedal position is treated as the indication of the desired engine output that is used as the input to the drive pulse generator 104. In such embodiments, the desired engine output signal 113 can be taken directly from a pedal position sensor on the vehicle, or it may be amplified in an appropriate manner. In other embodiments, the pedal position sensor signal may be combined with other inputs (such as the dither signal 207 described above) before it is provided to the drive pulse generator 104. In still other embodiments, the accelerator pedal position sensor signal may be provided to a preprocessor 181 (as represented by, for example, as a dashed box in FIG. 3), which either generates its own signal or does some level of processing on the pedal sensor signal. The output of the preprocessor 181 would then be used as the input to the drive pulse generator.

The preprocessor 181 may be arranged to provide any desired type of preprocessing of the accelerator pedal position sensor signal. For example, it may be desirable for an automobile to provide a fuel savings mode where the accelerator pedal position signal is preprocessed in a way that helps operate the engine in the most fuel efficient manner. In another example, it is generally known that some drivers tend to relatively rapidly fluctuate the pedal position. For such drivers it may be desirable for an automobile to provide a smooth driving mode in which a preprocessor averages or smoothes certain pedal position fluctuations. In still other implementations, the vehicle may include a cruise controller. In such vehicles, the cruise controller may be incorporated in the preprocessor or may serve as the source of the drive pulse generator's input signal 113 when the vehicle is in the cruise control mode. In still other embodiments, anti-aliasing filtering of the pedal position may be provided in the preprocessor 181. Of course, the preprocessor may be arranged to perform any other type of preprocessing that is deemed appropriate for the engine and/or vehicle being controlled.

Other Features

Although only a few embodiments of the invention have been described in detail, it should be appreciated that the invention may be implemented in many other forms without departing from the spirit or scope of the invention. Many of the examples given above relate to 4-stroke piston engines suitable for use in motor vehicles. However, it should be appreciated that the described continuously variable displacement approaches are very well suited for use in virtually any type of internal combustion engine. These include engines for virtually any type of vehicle—including cars, trucks, boats, aircraft, motorcycles, scooters, etc.; for non-vehicular applications such as generators, lawnmowers, leaf blowers, models, etc.; and virtually any other application that utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkins cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles.

Some of the examples above were based on Otto cycle engines which are typically throttled so they often do not operate at maximum compression. However, the concepts are equally applicable to unthrottled engines such as diesel cycle engines, Dual cycle engines, Miller Cycle engines, etc.

In most of the embodiments explicitly discussed above it was assumed that all of the cylinders would be used or otherwise operated in the continuously variable displacement mode. However, that is not a requirement. If desired for a particular application, the firing control unit can readily be designed to always skip some designated cylinder(s) (working chamber(s)) when the required displacement is below some designated threshold. In still other implementations, any of the described working cycle skipping approaches could be applied to traditional variable displacement engines while operating in a mode in which some of their cylinders have been shut down.

A characteristic of some implementations of the described variable displacement operational mode that is different from most commercially available variable displacement engines is that all of the working chambers are sometimes skipped during operation in the variable displacement mode. This can be advantageous in terms of evening wear on the engine.

The described continuously variable displacement mode of operation can readily be used with a variety of other fuel economy and/or performance enhancement techniques—including lean burning techniques, fuel injection profiling techniques, turbocharging, supercharging, etc.

Most of the drive pulse generator embodiments described in detail above utilized sigma delta controllers. Although it is believed that sigma delta controllers are very well suited for use in controlling the engine, it should be appreciated that a variety of other controllers, and particularly adaptive (i.e., feedback) controllers may be used or developed for use in place of the sigma delta control. For example, it should be appreciated that other feedback control schemes may be used to convert the inputted desired engine output signal 113 to a stream of drive pulses that can be used directly or indirectly to drive the engine.

In the primary described embodiments, the sigma delta controller is generally designed to convert the inputted desired engine output signal to signals that can be used by the synchronizer to generate drive pulses. Sigma delta is one type of converter that can be used to represent the input signal. As described above, sigma delta conversion is a type of oversampled conversion and other oversampled converters can readily be used in place of sigma delta conversion. In still other embodiments, other types of converters can be used as well. It should be appreciated that the converters may employ a wide variety of modulation schemes, including various pulse width modulation schemes, pulse height modulation, CDMA oriented modulation or other modulation schemes may be used to represent the input signal, so long as the synchronizer component of the drive pulse generator is adjusted accordingly.

It should be apparent from the foregoing that the described continually variable displacement approach works very well with existing engine designs. However, it is believed that the described skipped working cycle control approach will also facilitate or even enable a wide variety of other technologies that can be used to further improve the thermodynamic efficiency of the engine. For example, the use of a supercharger or a turbocharger in combination with the described continuously variable displacement approach can further improve the efficiency of an engine. Computer simulation models suggest that the combination of the described continuously variable displacement control approach with a supercharger can readily improve the fuel efficiency of many existing Otto cycle engines by over 200%.

One of the reasons that such significant improvements are possible in automotive engines is because many, if not most, automotive engines are operated at a relatively small percentage of their potential horsepower most of the time. For example, an engine that is designed to deliver maximum power outputs on the order of 200-300 horsepower, may require no more than 20-30 horsepower most of the time—as for example when the vehicle is cruising at 100 kilometers per hour.

It is noted that over the years, there have been a number of proposals that contemplated operating specific engines in a "skip fire" mode. However, it is the Applicant's understanding that none of these approaches have ever enjoyed any significant commercial success. It is suspected that a major factor that contributed to this lack of acceptance is that prior efforts were unable to control the engine in a manner that delivered the required engine smoothness, performance and drivability characteristics to enjoy commercial viability. In contrast, it is believed that the described engine control and operation approaches are well suited for use in a variety of different applications. Therefore, the present embodiments should be considered illustrative and not restrictive and the invention is not to be limited to the details given herein, but may be modified within the scope of the appended claims.

What is claimed is:

1. An internal combustion engine comprising:
a plurality of working chambers each arranged to operate in a succession of working cycles;
a fuel delivery system arranged to facilitate the delivery of fuel into the working chambers; and
a firing control unit arranged to control working chamber firings in the engine, wherein the firing control unit has a variable displacement operational mode that causes selected active working cycles to be fired and selected passive working cycles not to be fired, the firing control unit including,
  a drive pulse generator arranged to receive an input indicative of a desired engine output and to output a drive pulse signal that is synchronized with the engine speed, wherein the drive pulse signal defines a drive pulse pattern that generally indicates when active working cycles are appropriate to deliver the desired engine output; and
  a sequencer that receives the drive pulse signal and determines the active and passive working cycles based at least in part on the received drive pulse signal.

2. An internal combustion engine as recited in claim 1 wherein the drive pulse generator includes:
a control circuit that receives an analog input signal indicative of a desired engine output and outputs a feedback modified digital representation of the analog input signal; and
a synchronizer that receives the digital representation of the analog signal, and outputs a sequence of drive pulses, wherein the sequence of drive pulses that define the drive pulse pattern is synchronized with the engine speed.

3. An internal combustion engine as recited in claim 1 wherein:
the engine further includes an air supply throttle; and
the amount of air and fuel delivered to the working chambers during the first selected set of fired working cycles is set to cause the fired working chambers to operate at substantially their maximum thermodynamic efficiency.

4. An internal combustion engine as recited in claim 1 wherein the engine operates on a cycle selected from the group consisting of: a diesel cycle, an Otto cycle; a Miller cycle; a Wankel cycle, and a mixed thermodynamic cycle.

5. An internal combustion engine as recited in claim 1 wherein the internal combustion engine is a reciprocating piston engine having a plurality of cylinders, each cylinder serving as one of the working chambers, and wherein each cylinder has an associated piston, intake valve, and exhaust valve, wherein the engine is selected from the group consisting of: a two stroke piston engine; a four stroke piston engine; and a six stroke piston engine.

6. An internal combustion engine as recited in claim 1 wherein the drive pulse generator includes a sigma delta controller.

7. An internal combustion engine as recited in claim 6 wherein the sigma delta controller uses a clock signal that varies proportionally with engine speed.

8. An internal combustion engine as recited in claim 1 wherein the drive pulse generator receives:
an input signal indicative of accelerator pedal position that is interpreted by the fuel delivery unit as a control input indicative of a desired engine output; and
feedback indicative of at least one of proposed and actual working cycle firings.

9. An internal combustion engine as recited in claim 1 further comprising an engine control unit, wherein:
the firing control unit is implemented as a firing control co-processor and is arranged to control the operation in the variable displacement operational mode; and
the engine control unit is arranged to control the operation of an engine in a second operational mode.

10. An engine controller arranged to control working chamber firings in an engine, wherein the engine controller has a variable displacement operational mode that causes selected active working cycles to be fired and selected passive working cycles not to be fired, the engine controller comprising:
a drive pulse generator arranged to receive an input indicative of a desired engine output and to output a drive pulse signal that is synchronized with the engine speed, wherein the drive pulse signal defines a drive pulse pattern that generally indicates when active working cycles are appropriate to deliver the desired engine output; and a sequencer that receives the drive pulse signal and determines the active and passive working cycles based at least in part on the received drive pulse signal.

11. An engine controller as recited in claim 10 wherein the drive pulse generator and the sequencer cooperate to dynamically determine the fired and skipped working cycles on a firing opportunity by firing opportunity basis to provide the desired engine output without the use of stored firing patterns.

12. An engine controller as recited in claim 10 wherein the drive pulse generator is arranged to utilize feedback indicative of at least one of desired or actual working chamber firing in the determination of the drive pulse pattern.

13. An engine controller as recited in claim 10 wherein the drive pulse generator includes a predictive adaptive controller.

14. An engine controller as recited in claim 13 wherein the predictive adaptive controller is a sigma delta controller.

15. An engine controller as recited in claim 14 wherein the sigma delta controller is one selected from the group consisting of: an analog sigma delta controller, a digital sigma delta controller, a hybrid sigma delta controller, and a differential sigma delta controller.

16. An engine controller as recited in claim 14 wherein the sigma delta controller is a third order sigma delta controller.

17. An apparatus as recited in claim 13 wherein the predictive adaptive controller is selected from the group consisting of: a pulse width modulation controller, a least means square controller and a recursive least square controller.

18. An engine controller as recited in claim 13 further comprising a clock generator arranged to generate a clock signal synchronized with firing opportunities of the engine, and wherein the predictive adaptive controller is arranged to receive the clock signal and to synchronize the drive pulse signal with the clock signal such that the drive pulse signal is synchronized with the firing opportunities of the engine.

19. An engine controller as recited in claim 10 wherein the drive pulse generator includes:

a control circuit that receives an analog input signal indicative of a desired engine output and outputs a feedback modified digital representation of the analog input signal; and a synchronizer that receives the digital representation of the analog signal, and outputs a sequence of drive pulses that are synchronized with the engine speed, wherein the sequence of drive pulses defines the drive pulse pattern.

20. An engine controller as recited in claim 10 wherein the engine controller is further arranged to direct the delivery of a substantially optimized amount of air and fuel to a majority of the working cycles that are not skipped during operation in the variable displacement mode.

21. An engine controller as recited in claim 10 wherein the controller uses a clock signal that varies proportionally with engine speed.

22. An engine controller as recited in claim 10 wherein:

the engine controller is implemented as a firing control co-processor arranged to cooperate with an engine control unit to control the operation of an engine in the variable displacement operational mode; and the engine control unit is arranged to control the operation in a second operational mode.

23. A drive pulse generator suitable for use in an engine controller arranged to control working chamber firings in an engine, wherein the engine controller has a variable displacement operational mode that causes selected active working cycles to be fired and selected passive working cycles not to be fired, the drive pulse generator comprising:

an input signal digitizer arranged to receive an analog input signal indicative of a desired engine output and to output a digitizer output signal that is a feedback modified digital representation of the analog input signal; and a synchronizer arranged to receive the digitizer output signal and to output a drive pulse signal that is synchronized with the engine speed, wherein the drive pulse signal generally indicates when active working cycles are appropriate to deliver the desired engine output; and wherein feedback indicative of at least one of the drive pulse signal or a firing pattern that is based at least in part on the drive pulse signal is fed back to the input signal digitizer and is used in the generation of the digitizer output signal.

24. A method of controlling the operation of an internal combustion engine having a plurality of working chambers, each working chamber being generally arranged to operate in a succession of working cycles, the method comprising operating the engine in a variable displacement mode that includes:

delivering air and fuel to the working chambers during the active working cycles;

firing the working chambers in a firing pattern dynamically determined on a firing opportunity by firing opportunity basis during operation of the engine that skips the firing of selected skipped working cycles and fires selected active working cycles;

wherein an amount of air and fuel delivered to the working chambers during a first set of the active working cycles is substantially optimized; and wherein the firing pattern is determined at least in part using predictive adaptive control to provide a desired engine output, and wherein the predictive adaptive control includes feedback indicative of at least one of requested and actual working cycle firings.

25. A method as recited in claim 24 further comprising:

enabling the engine to operate in a second operating mode; and automatically determining whether to operate in the variable displacement mode or the second operating mode based at least in part upon the current operational state of the engine; and wherein in the second operating mode, the amount of air introduced to the working chambers is modulated by an air supply throttle, the amount of fuel introduced during specific working cycles is based at least in part on the amount of air introduced to the working chambers during such working cycles, and fuel is delivered to the working chambers during every working cycle of the engine such that none of the working cycles are skipped.

26. A method as recited in claim 24 wherein the selection of working cycles to be skipped is based at least in part on a current rotational speed of the engine.

27. A method as recited in claim 24 wherein the amount of fuel delivered to the working chambers during a second set of the active working cycles that are interspersed with the first set of working cycles is reduced relative to the amount of fuel delivered during the first set of active working cycles, wherein the selection of the working cycles in the second set of active working cycles is arranged to accomplish at least one of (a) smoothing the output of the engine, (b) helping reduce vibrations of the engine, (c) more precisely matching a desired engine output, and (d) reducing emissions from the engine.

28. A method as recited in claim 24 wherein the engine includes an air supply throttle and the throttle is operated at substantially full throttle in the variable displacement mode.

29. A method of controlling the operation of an internal combustion engine having at least one working chamber, each working chamber being generally arranged to operate in a succession of working cycles, wherein the method comprises operating the engine in a skip fire continuously variable displacement mode that includes:
generating a drive pulse pattern that is synchronized with firing opportunities of the engine, wherein the drive pulse pattern generally indicates when working cycles need to be fired to deliver a desired engine output;
generating a firing pattern based at least in part on the drive pulse pattern, wherein the firing pattern is not always the same as the drive pulse pattern; and
firing the at least one working chamber in accordance with the firing pattern, wherein the firing pattern skips the firing of selected skipped working cycles and fires selected active working cycles.

30. A method as recited in claim 29 wherein a substantially optimized amount of air and fuel is delivered to the working chambers during a majority of the active working cycles when the engine is in a first state of a continuously variable displacement operational mode.

31. A method as recited in claim 30 wherein the optimized amount of air and fuel delivered to the working chambers during the majority of the working cycles is optimized to substantially maximize the thermodynamic efficiency of the engine in the current operational state of the engine.

32. A method as recited in claim 29 wherein:
the firing pattern is determined at least in part using feedback control to provide a desired engine output; and
the feedback utilized in the feedback control includes information indicative of at least one of requested and actual working cycle firings.

33. A method as recited in claim 29 wherein the firing pattern is dynamically calculated during operation of the engine on a working cycle by working cycle basis to provide a desired engine output.

34. A method as recited in claim 29 wherein the firing pattern is determined at least in part using predictive adaptive control to provide the desired engine output.

35. A method as recited in claim 29 wherein the engine includes a throttle and the throttle is set at a first substantially fixed throttle position during operation at a first operational level in a skip fire variable displacement mode such that requests for changes in the desired output of the engine are generally met without substantially altering the throttle position.

36. A method as recited in claim 35 wherein in selected operating conditions, the engine is transitioned to a second operational level having a second substantially fixed throttle position that is different from the first throttle position while the engine remains in the skip fire variable displacement mode.

37. A method as recited in any of claim 36 wherein the transition to the second throttle position is triggered by one selected from the group consisting of:
the engine speed falling below a threshold engine speed; and
braking of a vehicle associated with the engine.

38. A method as recited in claim 29 wherein the engine is also able to operate in a second operating mode, the method further comprising:
automatically determining whether to operate in the skip fire variable displacement mode or the second operating mode based at least in part upon the current operational state of the engine; and
wherein in the second operating mode, the amount of air introduced to the working chambers is modulated by an air supply throttle, and fuel is delivered to the working chambers during every working cycle of the engine such that none of the working cycles are skipped.

39. A method as recited in claim 29 wherein:
a controller is arranged to generate the drive pulse pattern based at least in part upon a first input signal indicative of a desired engine output and a second input signal indicative of the current rotational speed of the engine; and
a sequencer is arranged to receive the drive pulse pattern and determine the firing pattern based at least in part on the drive pulse pattern, wherein the firing pattern generated by the sequencer is sometimes different than the drive pulse pattern.

40. A method as recited in claim 29 wherein an amount of fuel delivered to the working chambers during a second set of the active working cycles that are interspersed with the first set of working cycles is reduced relative to the amount of fuel delivered during the first set of active working cycles, wherein the selection of the working cycles in the second set of active working cycles is arranged to accomplish at least one of (a) smoothing the output of the engine, (b) helping reduce vibrations of the engine, (c) more precisely matching a desired engine output, and (d) reducing emissions from the engine.

41. A method as recited in claim 29 wherein:
each working chamber is a cylinder, each cylinder having an associated reciprocating piston positioned therein,
each cylinder has a four stroke working cycle including an expansion stroke that involves burning fuel; and
an odd number of reciprocations of a selected piston sometimes occur between the end of a first working cycle and a beginning of a next sequential working cycle that includes an expansion stroke that involves burning fuel.

42. A method as recited in claim 29 further comprising:
pumping air through the working chambers during the skipped working cycles; and
adjusting at least one of an emissions control unit and a signal inputted to the emissions control unit to compensate for extra oxygen detected in an exhaust gas stream due to the delivery of air to the working chambers during the skipped working cycles.

43. A method as recited in claim 29 wherein all of the working chambers are sometimes skipped during operation in the variable displacement mode and the order of the delivery of fuel to the working chambers is controlled such that all of the working chambers are fired substantially the same amount over time during operation in the variable displacement mode.

44. A method as recited in claim 29 wherein an indicia of the current rotational speed of the engine is used as a clock input for a controller used to generate the drive pulse pattern.

45. A method as recited in claim 29 wherein a dither signal is provided to a controller used to generate the drive pulse pattern.

46. A method of controlling the operation of an internal combustion engine having a plurality of working chambers in a variable displacement mode, each working chamber being generally arranged to operate in a sequence of working cycles, the method comprising:
causing selected working cycles to be skipped while insuring that all of the working chambers are fired in a fixed sequential order such that no working chamber will fire twice in the variable displacement mode before each of the other working chambers has been fired, wherein the selection of the skipped working cycles is determined to deliver a desired output.

47. A method of controlling the operation of an internal combustion engine having at least one cylinder, each cylinder having an associated reciprocating piston positioned therein, wherein each cylinder has a working cycle defined by a set integer number of sequential reciprocations of the associated piston, the working cycle including an expansion stroke that involves burning fuel, the method comprising:

operating the engine in a variable displacement mode in which a number of reciprocations of a selected piston that is not an integer multiple of the set number of sequential reciprocations that define a working cycle sometimes occur between the end of a first working cycle and a beginning of a next sequential working cycle that includes an expansion stroke that involves burning fuel.

* * * * *